US008319791B2

(12) United States Patent
Ueki et al.

(10) Patent No.: US 8,319,791 B2
(45) Date of Patent: Nov. 27, 2012

(54) DISPLAY

(75) Inventors: Shun Ueki, Nara (JP); Kozo Nakamura, Kashiba (JP); Tokio Taguchi, Tenri (JP); Akiko Itou, Uji (JP)

(73) Assignee: Sharp Kabushiki Kaisha, Osaka (JP)

( * ) Notice: Subject to any disclaimer, the term of this patent is extended or adjusted under 35 U.S.C. 154(b) by 996 days.

(21) Appl. No.: 12/088,887

(22) PCT Filed: Jun. 5, 2006

(86) PCT No.: PCT/JP2006/311232
§ 371 (c)(1),
(2), (4) Date: Apr. 1, 2008

(87) PCT Pub. No.: WO2007/039957
PCT Pub. Date: Apr. 12, 2007

(65) Prior Publication Data
US 2009/0273607 A1   Nov. 5, 2009

(30) Foreign Application Priority Data
Oct. 3, 2005 (JP) ................................ 2005-290005

(51) Int. Cl.
G09G 5/00 (2006.01)
G09G 5/02 (2006.01)
(52) U.S. Cl. ........................................ 345/613; 345/590
(58) Field of Classification Search .......... 345/589–605, 345/87–88
See application file for complete search history.

(56) References Cited

U.S. PATENT DOCUMENTS

| 4,800,375 A | 1/1989 | Silverstein et al. |
| 6,809,714 B1 * | 10/2004 | Yamauchi et al. ............. 345/88 |
| 2004/0174389 A1 * | 9/2004 | Ben-David et al. .......... 345/694 |
| 2005/0122294 A1 | 6/2005 | Ben-David et al. |

FOREIGN PATENT DOCUMENTS

| JP | 09-251160 A | 9/1997 |
| JP | 2001-209047 A | 8/2001 |
| JP | 2001-306023 A | 11/2001 |
| JP | 2002-323689 A | 11/2002 |
| JP | 2002323689 A * | 11/2002 |
| JP | 2003-248462 A | 9/2003 |

(Continued)

OTHER PUBLICATIONS

Official communication issued in the International Application No. PCT/JP2006/311232, mailed on Aug. 22, 2006.

(Continued)

Primary Examiner — Tize Ma
Assistant Examiner — Yingchun He
(74) Attorney, Agent, or Firm — Keating & Bennett, LLP

(57) ABSTRACT

A display device has a pixel that is defined by a plurality of sub-pixels. The sub-pixels include a red sub-pixel representing red, a green sub-pixel representing green, a blue sub-pixel representing blue and a yellow sub-pixel representing yellow. When the pixel represents white, the luminance of the red sub-pixel is lower than its luminance corresponding to the highest gray scale level. In one embodiment, when the pixel represents white, the luminance of the red sub-pixel is preferably in the range of 25% to 96% of its luminance corresponding to the highest gray scale level. Also, the color temperature of white represented by the pixel is preferably higher than 4200 K, more preferably higher than 5000 K.

8 Claims, 11 Drawing Sheets

FOREIGN PATENT DOCUMENTS

JP 2003-302960 A 10/2003
JP 2004-152737 A 5/2004

OTHER PUBLICATIONS

Yang et al.; "Development of Six Primary-Color LCD"; SID 05 Digest; May 25, 2005; pp. 1210-1213.

Chino et al.; "Development of Wide-Color-Gamut Mobile Displays With Four-Primary-Color LCDs"; SID 06 Digest; Jun. 7, 2006; pp. 1221-1224.

Ben-Chorin; "Improving LCD TV Color Using Multi-Primary Technology"; Genoa Color Technologies; Flat Panel Display; International 2005 Forum; Oct. 19, 2005; pp. 1-53.

Ueki et al.: "Liquid Crystal Display Device," U.S. Appl. No. 12/442,733, filed Mar. 25, 2009.

English translation of the official communication issued in counterpart International Application No. PCT/JP2006/311232, mailed on Apr. 17, 2008.

Kelly: "Color Designations for Lights," Journal of the Optical Society of America, vol. 33, No. 11; Nov. 1943; pp. 627-632.

* cited by examiner

DISPLAY

BACKGROUND OF THE INVENTION

1. Field of the Invention

The present invention relates to a display device for conducting a display operation using four primary colors.

2. Description of the Related Art

A color display device such as a color TV monitor or a color display monitor represents colors usually by adding together the three primary colors of red (R), green (G) and blue (b). Thus, each pixel in a color display device (such as a liquid crystal display device) has red, green and blue sub-pixels for these three primary colors of RGB. By controlling the luminances of these red, green and blue sub-pixels to desired values, a variety of colors can be represented.

The luminance of each sub-pixel varies within the range from the one corresponding to the lowest gray scale level thereof (e.g., gray scale level 0) through the one corresponding to the highest gray scale level (e.g., gray scale level 255). If all of these sub-pixels, namely, the red, green and blue sub-pixels, have the minimum luminance, the color represented by the pixel is black. Conversely, if all of these sub-pixels have the maximum luminance, the color represented by the pixel is white.

FIG. 16 schematically illustrates a pixel in a conventional LCD. As shown in FIG. 16, a single pixel has three sub-pixels (i.e., red, green and blue sub-pixels). Strips of red, green and blue sub-pixels are arranged in stripes in this order. These red, green and blue sub-pixels are formed by defining three sub-pixel regions in a single pixel region on a color filter (not shown).

The following Table 1 shows exemplary XYZ color system values of colors represented by pixels in a conventional LCD:

TABLE 1

|   | Red | Green | Blue | White |
|---|-----|-------|------|-------|
| X | 94.7 | 75.8 | 40.1 | 210.5 |
| Y | 48.2 | 155.7 | 14.6 | 218.5 |
| Z | 3.5 | 19.1 | 231.2 | 253.8 |
| x | 0.646 | 0.302 | 0.140 | 0.308 |
| y | 0.329 | 0.622 | 0.051 | 0.320 |
| z | 0.024 | 0.076 | 0.809 | 0.372 |

Color temperature = 6800 K

In Table 1, "Red" shows the XYZ color system values of a color represented by a pixel in a situation where the red sub-pixel has the maximum luminance but the green and blue sub-pixels have the minimum luminance. In the same way, "Green" shows the XYZ color system values of a color represented by a pixel in a situation where the green sub-pixel has the maximum luminance but the red and blue sub-pixels have the minimum luminance. "Blue" shows the XYZ color system values of a color represented by a pixel in a situation where the blue sub-pixel has the maximum luminance but the red and green sub-pixels have the minimum luminance. And "White" shows the XYZ color system values of white represented by a pixel in a situation where the red, green and blue sub-pixels all have the maximum luminance.

Also, X, Y, Z, x, y and z of Table 1 are the X, Y, Z, x, y and z according to the XYZ color system. It should be noted that X, Y and Z are rounded off to the first decimal place, while x, y and z are rounded off to the third decimal place. As is apparent to those skilled in the art, according to the XYZ color system, $x=X/(X+Y+Z)$, $y=Y/(X+Y+Z)$, and $z=Z/(X+Y+Z)$, where x and y are also called "chromaticity" and Y corresponds to the lightness. The results shown in Table 1 were obtained using a backlight, a liquid crystal layer, and color filters with the following properties.

FIG. 17 is a graph showing the spectrum of the light emitted from the backlight (not shown) of a conventional LCD. This backlight emits white light with chromaticities (xy)=(0.31, 0.30). FIG. 18 is a graph showing the wavelength-transmitted light intensity characteristic of the liquid crystal layer of a conventional LCD.

FIG. 19 is a graph showing the wavelength dependences of respective color filters for red, green and blue sub-pixels. In FIG. 19, the curve "Red" shows how the transmittance changes with the wavelength in a color filter for the red sub-pixel, the curve "Green" shows how the transmittance changes with the wavelength in a color filter for the green sub-pixel, and the curve "Blue" shows how the transmittance changes with the wavelength in a color filter for the blue sub-pixel.

FIG. 20 schematically shows the luminances of red, green and blue sub-pixels when a conventional LCD represents white. In FIG. 20, R, G and B denote the red, green and blue sub-pixels, respectively. When white is represented, the red, green and blue sub-pixels have the maximum luminance.

In the conventional LCD, the X of the white is the sum of the respective X of Red, Green and Blue. In the same way, the Y of the white is the sum of the respective Y of Red, Green and Blue. And the Z of the white is the sum of the respective Z of Red, Green and Blue. Thus, as shown in Table 1, the X, Y and Z of the white are 210.5 (=94.7+75.8+40.1), 218.5 (=48.2+155.7+14.6) and 253.8 (=3.5+19.1+231.2), respectively. In this case, the x, y and z are 0.308, 0.320 and 0.372, respectively. The color temperature of the conventional LCD is 6800 K as shown in Table 1.

FIG. 21 is a graph showing a chromaticity diagram of the XYZ color system. In FIG. 21, the abscissa and ordinate of this graph represent x and y coordinates in the XYZ color system. The graph of FIG. 21 shows a spectrum locus and dominant wavelengths. The spectrum locus shows the relation between the color temperature of the blackbody locus and the chromaticity. As the temperature of the blackbody (which is a perfect radiator) is increased, the light emitted from the blackbody changes its colors. In this case, the absolute temperature T [K] of the blackbody is called a "color temperature". In general, white of a display device is represented by the color temperature.

Such display devices that use the three primary colors have been used extensively so far. Recently, however, a display device for an additive mixture of four primary colors was also proposed. Such a display device further increases the number of primary colors used by adding Ye to the three primary colors of RGB, thereby expanding the color reproduction range (see Patent Documents Nos. 1 to 3, for example).

Patent Document No. 1: Japanese Patent Application Laid-Open Publication No. 2001-306023

Patent Document No. 2: PCT International Application Japanese National Phase Publication No. 2004-529396

Patent Document No. 3: Japanese Patent Application Laid-Open Publication No. 2001-209047

FIG. 22 schematically illustrates a pixel in the display devices disclosed in Patent Documents Nos. 1, 2 and 3, for example. As shown in FIG. 22, the single pixel has four sub-pixels (namely, red, green, blue and yellow sub-pixels), which are arranged in a mosaic pattern.

The color filters of such a display device has wavelength dependences such as those shown in FIG. 23. As in FIG. 23, the curves "Red", "Green" and "Blue" show how the transmittance changes with the wavelength in color filters for the red, green and blue sub-pixels, respectively, just like as shown in FIG. 19. And the curve "Yellow" shown in FIG. 23 shows how the transmittance changes with the wavelength in a color filter for the yellow sub-pixel. Supposing this display device uses a backlight with the spectrum shown in FIG. 17 and uses a liquid crystal layer with the wavelength-transmitted light intensity characteristic such as that shown in FIG. 18, the display device conducts a display operation in the following manner.

The following Table 2 shows exemplary XYZ color system values of colors represented by pixels in such a display device:

TABLE 2

|   | Red | Green | Blue | Yellow | White |
|---|---|---|---|---|---|
| X | 63.9 | 51.2 | 27.1 | 179.0 | 321.1 |
| Y | 32.6 | 105.1 | 9.8 | 195.7 | 343.3 |
| Z | 2.4 | 12.9 | 156.1 | 11.6 | 182.9 |
| x | 0.646 | 0.302 | 0.140 | 0.463 | 0.379 |
| y | 0.329 | 0.622 | 0.051 | 0.507 | 0.405 |
| z | 0.024 | 0.076 | 0.809 | 0.030 | 0.216 |

Color temperature = 4200 K

In Table 2, "Yellow" shows the XYZ color system values of a color represented by a pixel in a situation where the yellow sub-pixel has the maximum luminance. In this case, the red, green and blue sub-pixels of an LCD that uses these four primary colors have the similar configuration as their counterparts of the LCD shown in FIG. 16 that uses the three primary colors except that the area of each sub-pixel in the former LCD is three-quarters of that of its counterpart in the latter LCD. That is why the X, Y and Z values of Red, Green and Blue in Table 2 are three-quarters of those of their counterparts in Table 1. Just like the display device that uses the three primary colors, this display device also sets the luminances of all sub-pixels to be maximum in representing white.

FIG. 24 schematically shows the luminances of red, green, blue and yellow sub-pixels when this display device represents white. In FIG. 24, R, G, B and Ye denote the red, green, blue and yellow sub-pixels, respectively. When white is represented, the red, green, blue and yellow sub-pixels have the maximum luminance.

In this case, the X of the white is the sum of the respective X of Red, Green, Blue and Yellow. In the same way, the Y of the white is the sum of the respective Y of Red, Green, Blue and Yellow. And the Z of the white is the sum of the respective Z of Red, Green, Blue and Yellow.

Thus, the X, Y and Z of the white are 321.1 (=63.9+51.2+ 27.1+179.0), 343.3 (=32.6+105.1+9.8+195.7), and 182.9 (=2.4+12.9+156.1+11.6), respectively. In this case, the x, y and z are 0.379, 0.405 and 0.216, respectively. The color temperature of this display device is 4200 K as shown in Table 2. Look at FIG. 21 again, and it can be seen that the display device using the four primary colors has a lower color temperature than its counterpart using the three primary colors, and therefore, represents yellowish white. As a result, the display quality declines in the display device that uses the four primary colors.

SUMMARY OF THE INVENTION

In order to overcome the problems described above, preferred embodiments of the present invention provide a display device that has a broad color reproduction range and that achieves a high color temperature.

A display device according to a preferred embodiment of the present invention has a pixel that is defined by a plurality of sub-pixels. The sub-pixels include a red sub-pixel representing red, a green sub-pixel representing green, a blue sub-pixel representing blue and a yellow sub-pixel representing yellow. When the pixel represents white, the luminance of the red sub-pixel is lower than its luminance corresponding to the highest gray scale level.

In one preferred embodiment, the red sub-pixel has a dominant wavelength of 597 nm to less than 780 nm, the green sub-pixel has a dominant wavelength of 488 nm to less than 558 nm, the blue sub-pixel has a dominant wavelength of 380 nm to less than 488 nm, and the yellow sub-pixel has a dominant wavelength of 558 nm to less than 597 nm.

In another preferred embodiment, when the pixel represents white, the luminance of the red sub-pixel is 96% or less of its luminance corresponding to the highest gray scale level.

In still another preferred embodiment, when the pixel represents white, the luminance of the red sub-pixel is 25% or more of its luminance corresponding to the highest gray scale level.

In yet another preferred embodiment, when the pixel represents white, the luminance of each of the green, blue and yellow sub-pixels corresponds to the highest gray scale level thereof.

In yet another preferred embodiment, the color temperature of white represented by the pixel is higher than 4200 K.

In this particular preferred embodiment, the color temperature of white represented by the pixel is equal to or higher than 5000 K.

Another display device according to a preferred embodiment of the present invention is a display device of a field sequential type. The device has a pixel and conducting a display operation using a frame that includes a red subframe to make the pixel represent red, a green subframe to make the pixel represent green, a blue subframe to make the pixel represent blue, and a yellow subframe to make the pixel represent yellow. When the pixel represents white in the frame, the luminance of the pixel in the red subframe is lower than its luminance corresponding to the highest gray scale level.

A display device according to a preferred embodiment of the present invention can achieve a high color temperature with the decrease in luminance minimized.

These and other features, elements, characteristics and advantages of the present invention will become more apparent from the following detailed description of preferred embodiments thereof with reference to the drawings.

DETAILED DESCRIPTION OF THE PREFERRED EMBODIMENTS

First Preferred Embodiment

Hereinafter, a first preferred embodiment of a display device according to the present invention will be described with reference to the accompanying drawings.

Figure 1:
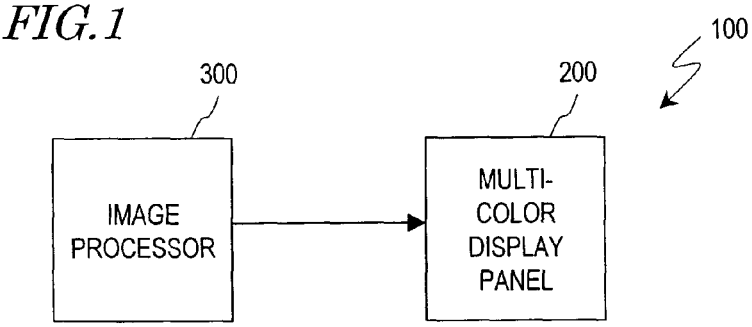
FIG. 1 is a block diagram schematically showing the configuration of a first preferred embodiment of a display device according to the present invention.

FIG. 1 is a block diagram schematically showing the configuration of a display device 100 of this preferred embodiment. As shown in FIG. 1, the display device 100 includes a multi-color display panel 200 and an image processor 300 for generating a signal to be supplied to the multi-color display panel 200. The multi-color display panel 200 may be an LCD panel, for example.

Figure 2:
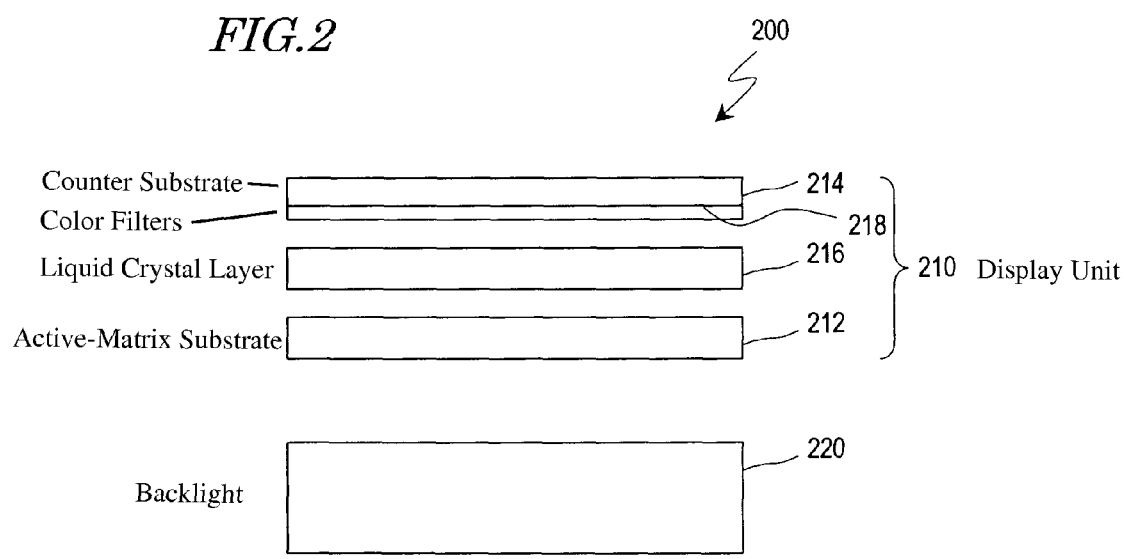
FIG. 2 is a block diagram schematically showing the structure of a multi-color display panel in the first preferred embodiment of the present invention.

In the display device 100 of this preferred embodiment, the multi-color display panel 200 includes a display unit 210 and a backlight 220 as shown in FIG. 2. The display unit 210 includes an active-matrix substrate 212, a counter substrate 214 and a liquid crystal layer 216, which is sandwiched between the active-matrix substrate 212 and the counter substrate 214. Color filters 218 are arranged on the counter substrate 214. LEDs are used as the light source of the backlight 220. The multi-color display panel 200 has a plurality of pixels, each of which is defined by a number of sub-pixels.

Figure 3:
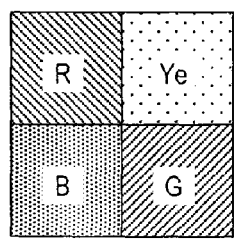
FIG. 3 schematically illustrates a pixel in the first preferred embodiment of the present invention.

FIG. 3 schematically illustrates a pixel in the display device 100. As shown in FIG. 3, a single pixel has four sub-pixels (namely, red, green, blue and yellow sub-pixels), which preferably have a square shape and are arranged in a mosaic pattern. The four sub-pixels in a single pixel are formed by defining four different sub-pixel regions per pixel region in the color filters 218.

Figure 17:
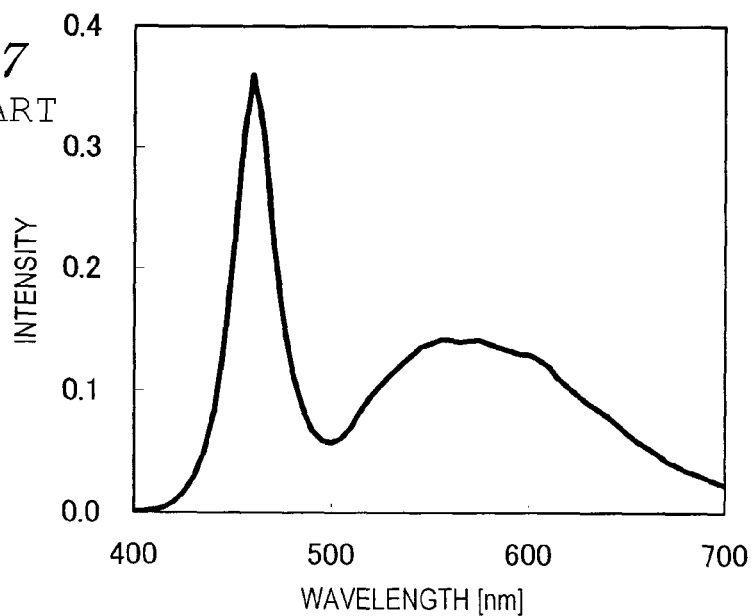
FIG. 17 is a graph showing the spectrum of the light emitted from the backlight of a conventional LCD.
Figure 18:
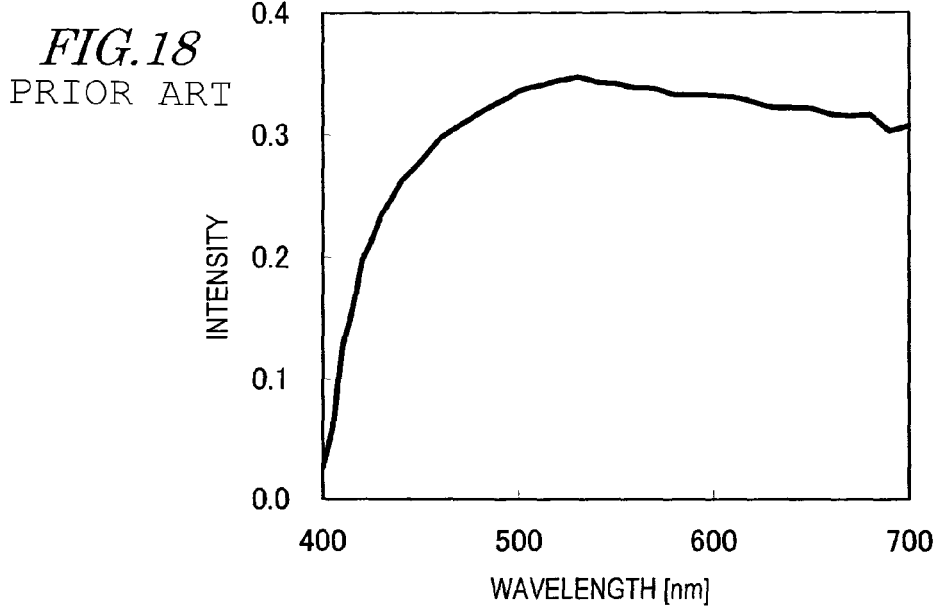
FIG. 18 is a graph showing the wavelength-transmitted light intensity characteristic of the liquid crystal layer of a conventional LCD.
Figure 19:
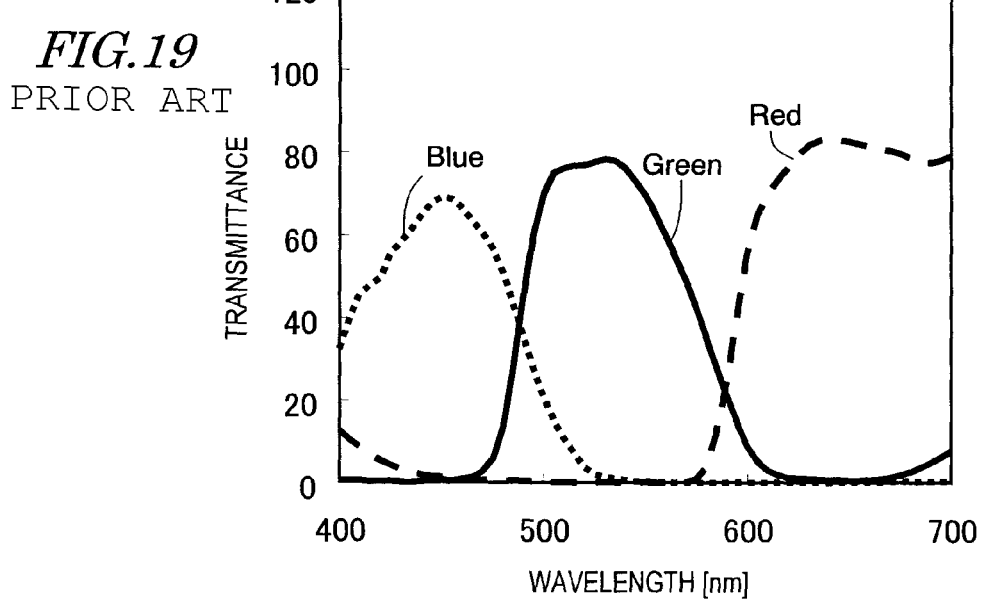
FIG. 19 is a graph showing the wavelength dependences of R, G and B color filters in a conventional LCD.
Figure 20:
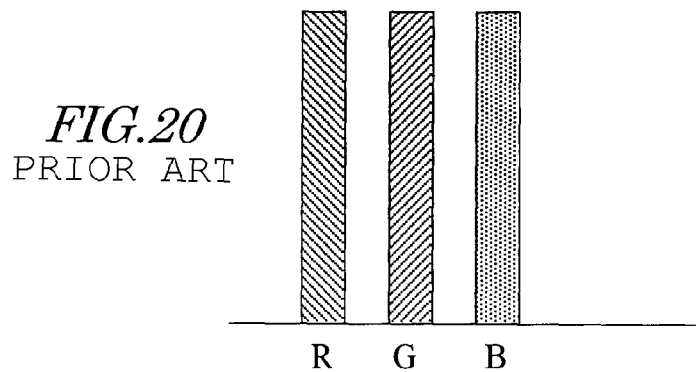
FIG. 20 schematically shows the luminances of red, green and blue sub-pixels when a conventional LCD represents white.
Figure 21:
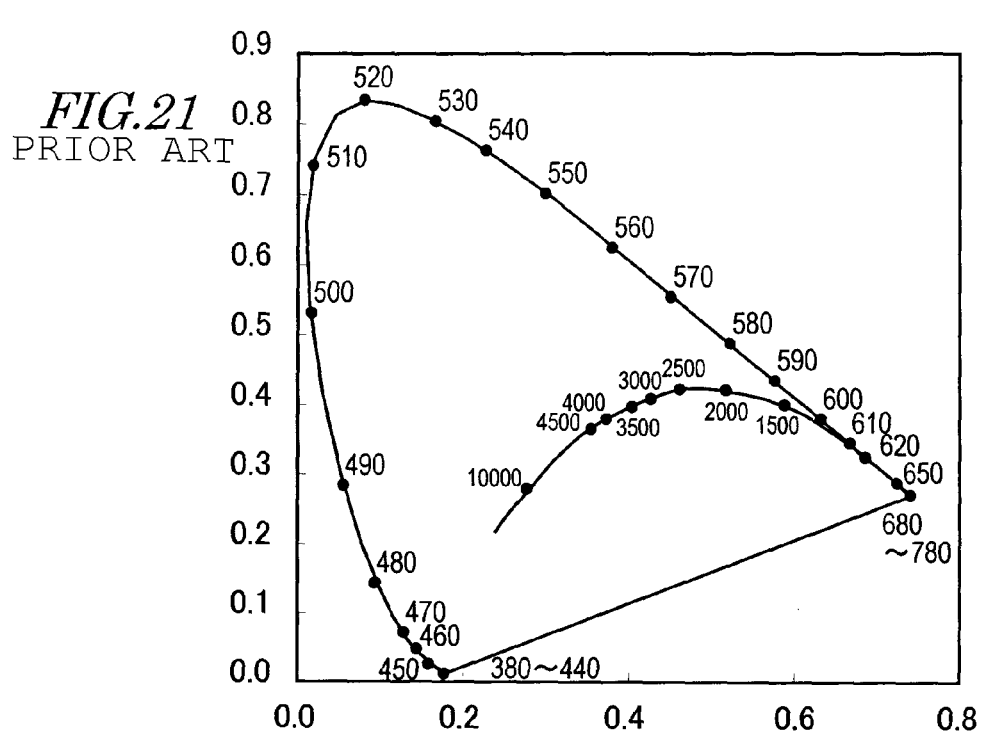
FIG. 21 is a graph showing a chromaticity diagram of the XYZ color system.
Figure 22:
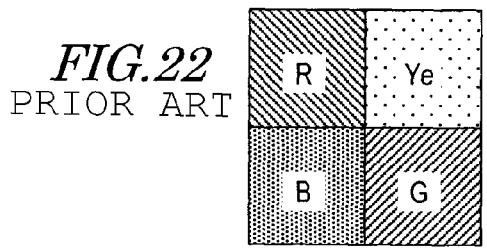
FIG. 22 schematically illustrates a pixel in another conventional LCD.
Figure 23:
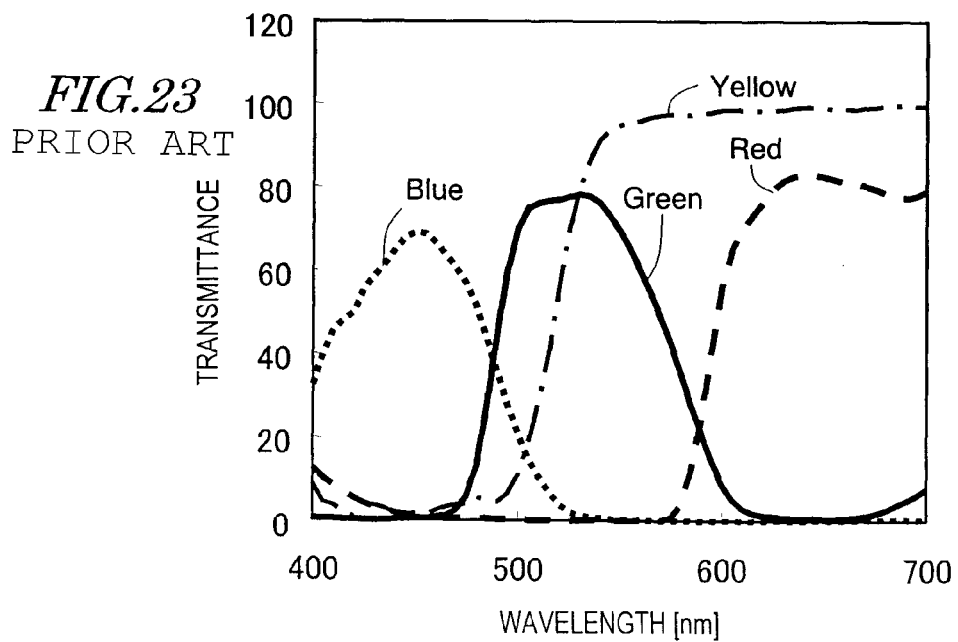
FIG. 23 is a graph showing the wavelength dependences of R, G, B and Ye color filters in a conventional LCD.

In the display device 100 of this preferred embodiment, the backlight 220 emits light with the similar spectrum as that shown in FIG. 17. Also, the liquid crystal layer of the display device 100 has the similar wavelength-transmitted light intensity characteristic as that shown in FIG. 18. And the color filters 218 have the similar wavelength dependences as those shown in FIG. 23.

The luminance of each of these sub-pixels varies within the range from the lowest one (which may correspond to the lowest gray scale level 0, for example) through the highest one (which may correspond to the highest gray scale level 255, for example) thereof. In the following description herein, the luminance of each sub-pixel when the sub-pixel has the lowest gray scale level will be referred to herein as the "minimum luminance", while the luminance of each sub-pixel when the sub-pixel has the highest gray scale level will be referred to herein as the "maximum luminance". When all of these sub-pixels (i.e., red, green, blue and yellow sub-pixels) have their minimum luminances, the color represented by the pixel is black. By varying the voltage applied to the liquid crystal layer 216 (see FIG. 2), the luminance (or gray scale level) of each sub-pixels can be changed. The display device 100 can represent a variety of colors by setting the luminances of the red, green, blue and yellow sub-pixels to arbitrary values.

Figure 4:
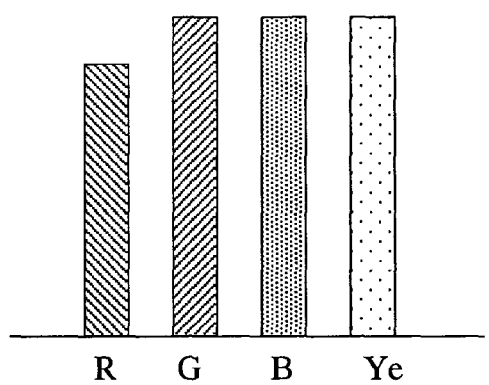
FIG. 4 schematically shows the luminances of red, green, blue and yellow sub-pixels when white is represented in the first preferred embodiment of the present invention.

FIG. 4 schematically shows the luminances of the red, green, blue and yellow sub-pixels when the display device 100 of this preferred embodiment represents white. In FIG. 4, R, G, B and Ye denote the red, green, blue and yellow sub-pixels, respectively. It should be noted that the lengths of the bars shown in FIG. 4 represent the luminances but do not represent the absolute values of the luminances of the red, green, blue and yellow sub-pixels but the percentages to their respective maximum luminances. If those percentages to the maximum luminances are equal to each other, then such a situation will be regarded herein as having the same output level (or luminance level). In the display device 100 of this preferred embodiment, when the pixel represents white, the luminances of the green, blue and yellow sub-pixels are set equal to their maximum ones, while the luminance of the red sub-pixel is set to be a luminance that is lower than its maximum luminance. As a result, the display device 100 achieves a high color temperature.

Hereinafter, situations where the luminance of the red sub-pixel is set to be lower than its maximum luminance when the pixel represents white will be described in detail. First, it will be described what if the red sub-pixel has the minimum luminance.

The following Table 3 shows exemplary XYZ color system values of colors represented by pixels in the display device 100 of this preferred embodiment:

TABLE 3

|   | Red | Green | Blue | Yellow | White |
|---|-----|-------|------|--------|-------|
| X | 63.9 | 51.2 | 27.1 | 179.0 | 257.2 |
| Y | 32.6 | 105.1 | 9.8 | 195.7 | 310.7 |
| Z | 2.4 | 12.9 | 156.1 | 11.6 | 180.6 |
| x | 0.646 | 0.302 | 0.140 | 0.463 | 0.344 |
| y | 0.329 | 0.622 | 0.051 | 0.507 | 0.415 |
| z | 0.024 | 0.076 | 0.809 | 0.030 | 0.241 |

Color temperature = 5200 K

In Table 3, "Red" shows the XYZ color system values of a color represented by a pixel in a situation where the red sub-pixel has the maximum luminance but the green, blue and yellow sub-pixels have the minimum luminance. In the same way, "Green" and "Blue" shows the XYZ color system values of two colors represented by a pixel in respective situations where the green and blue sub-pixels have the maximum luminance but the other sub-pixels have the minimum luminance. "Yellow" shows the XYZ color system values of a color represented by a pixel in a situation where the yellow sub-pixel has the maximum luminance but the other sub-pixels have the minimum luminance. And "White" shows the XYZ color system values of white represented by the red, green, blue and yellow sub-pixels.

Also, X, Y, Z, x, y and z of Table 3 are the X, Y, Z, x, y and z according to the XYZ color system. As is apparent to those skilled in the art, according to the XYZ color system, $x=X/(X+Y+Z)$, $y=Y/(X+Y+Z)$, and $z=Z/(X+Y+Z)$, where x and y are also called "chromaticity" and Y corresponds to the lightness.

As already described with reference to Table 2, in the conventional display device that uses the four primary colors, when a pixel represents white, the red, green, blue and yellow sub-pixels have their maximum luminances and the X, Y and Z of the white are the sums of the respective X, Y and Z of Red, Green, Blue and Yellow. On the other hand, in the display device 100 of this preferred embodiment, when white is represented, the red sub-pixel has its minimum luminance, while the green, blue and yellow sub-pixels have their maximum luminances.

Thus, in the display device 100 of this preferred embodiment, the X of the white is the sum of the X of Green, Blue and Yellow, which does not include that of Red. In the same way, the Y of the white is the sum of the Y of Green, Blue and Yellow, which does not include that of Red, either. And the Z of the white is the sum of the Z of Green, Blue and Yellow, which does not include that of Red again. Consequently, the X, Y and Z in the display device 100 of this preferred embodiment are 257.2 (=51.2+27.1+179.0), 310.7 (=105.1+9.8+195.7), and 180.6 (=12.9+156.1+11.6), respectively. Also, x, y and z become 0.344, 0.415, and 0.241, respectively. In the display device 100 of this preferred embodiment, the color temperature is 5200 K as shown in Table 3. Thus, the display device 100 of this preferred embodiment achieves a higher color temperature than 4200 K, which is achieved by the conventional display device that uses the four primary colors as already described with reference to Table 2.

It should be noted that when white is represented, the luminance of the red sub-pixel does not have to be its lowest one. Hereinafter, three different situations where the luminances of the red sub-pixel are respectively 25%, 50% and 75% of its maximum one when white is represented will be described with reference to Tables 4, 5 and 6.

The following Table 4 shows exemplary XYZ color system values of colors represented by pixels in the display device 100 of this preferred embodiment. In this case, when white is represented, the luminance of the red sub-pixel is set to be 25% of its maximum luminance:

TABLE 4

|   | Red | Green | Blue | Yellow | White |
|---|-----|-------|------|--------|-------|
| X | 63.9 | 51.2 | 27.1 | 179.0 | 273.1 |
| Y | 32.6 | 105.1 | 9.8 | 195.7 | 318.8 |
| Z | 2.4 | 12.9 | 156.1 | 11.6 | 181.2 |
| x | 0.646 | 0.302 | 0.140 | 0.463 | 0.353 |
| y | 0.329 | 0.622 | 0.051 | 0.507 | 0.412 |
| z | 0.024 | 0.076 | 0.809 | 0.030 | 0.234 |

Color temperature = 4900 K

When white is represented, the luminance of the red sub-pixel is 25% of its maximum luminance, while the green, blue and yellow sub-pixels have their maximum luminances. That is why in the display device 100 of this preferred embodiment, the X of the white is the sum of 25% of the X of Red and the respective X of Blue, Green and Yellow. In the same way, the Y of the white is the sum of 25% of the Y of Red and the respective Y of Blue, Green and Yellow. And the Z of the white is the sum of 25% of the Z of Red and the respective Z of Blue, Green and Yellow. Consequently, in the display device 100 of this preferred embodiment, the X, Y and Z of the white are 273.1 (=(63.9×0.25)+51.2+27.1+179.0), 318.8 (=(32.6×0.25)+105.1+9.8+195.7), and 181.2 (=(2.4×0.25)+12.9+156.1+11.6), respectively. In this case, x, y and z become 0.353, 0.412 and 0.234, respectively, and the color temperature is 4900 K as shown in Table 4.

The following Table 5 shows exemplary XYZ color system values of colors represented by pixels in the display device 100 of this preferred embodiment. In this case, when white is represented, the luminance of the red sub-pixel is set to be 50% of its maximum luminance:

TABLE 5

|   | Red | Green | Blue | Yellow | White |
|---|-----|-------|------|--------|-------|
| X | 63.9 | 51.2 | 27.1 | 179.0 | 289.1 |
| Y | 32.6 | 105.1 | 9.8 | 195.7 | 327.0 |
| Z | 2.4 | 12.9 | 156.1 | 11.6 | 181.7 |
| x | 0.646 | 0.302 | 0.140 | 0.463 | 0.362 |
| y | 0.329 | 0.622 | 0.051 | 0.507 | 0.410 |
| z | 0.024 | 0.076 | 0.809 | 0.030 | 0.228 |

Color temperature = 4600 K

When white is represented, the luminance of the red sub-pixel is 50% of its maximum luminance, while the green, blue and yellow sub-pixels have their maximum luminances. That is why in the display device 100 of this preferred embodiment, the X, Y and Z of the white are the respective sums of 50% of the X, Y and Z of Red and the respective X, Y and Z of Blue, Green and Yellow. Consequently, the X, Y and Z of the white are 289.1 (=(63.9×0.5)+51.2+27.1+179.0), 327.0 (=(32.6×0.5)+105.1+9.8+195.7), and 181.7 (=(2.4×0.5)+12.9+156.1+11.6), respectively. In this case, x, y and z become 0.362, 0.410 and 0.228, respectively, and the color temperature is 4600 K as shown in Table 5.

The following Table 6 shows exemplary XYZ color system values of colors represented by pixels in the display device 100 of this preferred embodiment. In this case, when white is represented, the luminance of the red sub-pixel is set to be 75% of its maximum luminance:

TABLE 6

|   | Red | Green | Blue | Yellow | White |
|---|-----|-------|------|--------|-------|
| X | 63.9 | 51.2 | 27.1 | 179.0 | 305.1 |
| Y | 32.6 | 105.1 | 9.8 | 195.7 | 335.1 |
| Z | 2.4 | 12.9 | 156.1 | 11.6 | 182.3 |
| x | 0.646 | 0.302 | 0.140 | 0.463 | 0.371 |
| y | 0.329 | 0.622 | 0.051 | 0.507 | 0.407 |
| z | 0.024 | 0.076 | 0.809 | 0.030 | 0.222 |

Color temperature = 4400 K

When white is represented, the luminance of the red sub-pixel is 75% of its maximum luminance, while the green, blue and yellow sub-pixels have their maximum luminances. That is why in the display device 100 of this preferred embodiment, the X, Y and Z of the white are the respective sums of 75% of the X, Y and Z of Red and the respective X, Y and Z of Blue, Green and Yellow. Consequently, the X, Y and Z of the white are 30.5.1 (=(63.9×0.75)+51.2+27.1+179.0), 335.1 (=(32.6×0.75)+105.1+9.8+195.7), and 182.3 (=(2.4×0.75)+12.9+156.1+11.6), respectively. In this case, x, y and z become 0.371, 0.407 and 0.222, respectively, and the color temperature is 4400 K as shown in Table 6.

As described with reference to Tables 4, 5 and 6, no matter whether the luminance of the red sub-pixel is set to be 25%, 50% or 75% of its maximum value when white is represented, a color temperature that is higher than 4200 K, which is achieved by the conventional display device that uses the four primary colors as already described with reference to Table 2, is always achieved. It should be noted that the lower the luminance of the red sub-pixel in representing white, the higher the color temperature achieved will be.

Figure 5:
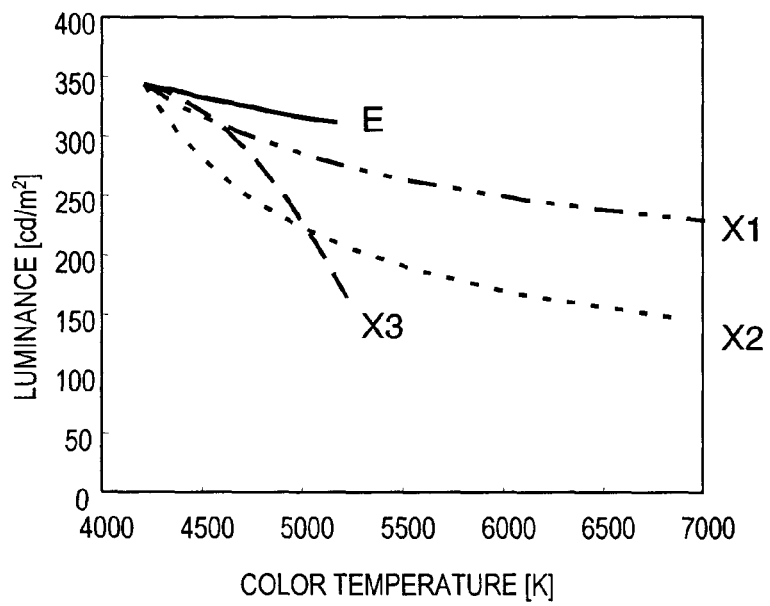
FIG. 5 is a graph showing how the luminance changes with the color temperature in the first preferred embodiment of the present invention.

Hereinafter, it will be described with reference to FIG. 5 what effects will be achieved if the color temperature is increased by setting the luminance of the red sub-pixel lower than its maximum value in representing white. FIG. 5 is a graph showing how the luminance changes with the color temperature in the display device 100 of this preferred embodiment. In FIG. 5, the abscissa represents the color temperature and the ordinate represents the luminance in representing white.

In FIG. 5, the curve E shows the results obtained by the display device 100 of this preferred embodiment when the luminance of the red sub-pixel was set to be lower than its maximum value in representing white. As already described with reference to Tables 3 through 6, the lower the luminance of the red sub-pixel is set to be, the higher the color temperature can be.

Figure 6:
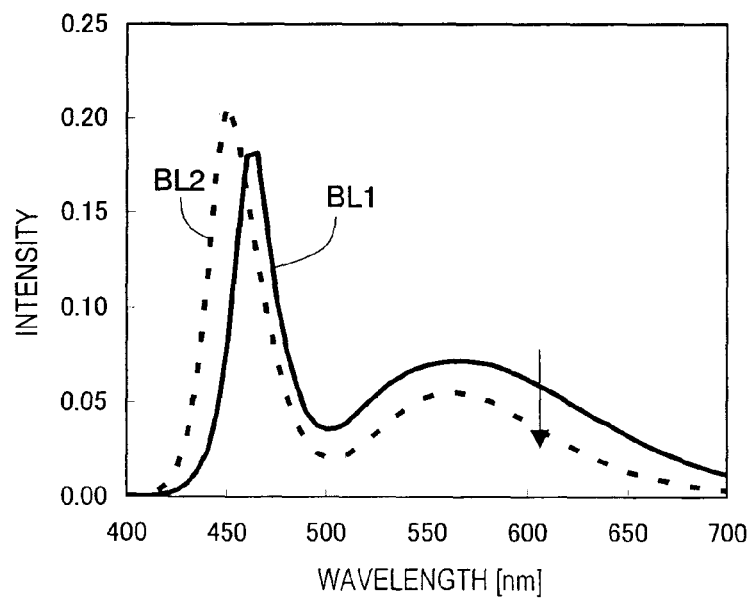
FIG. 6 is a graph showing the spectrum of light emitted from a backlight in the first preferred embodiment of the present invention and that of light emitted from another backlight, of which the color temperature was raised.

It should be noted that the color temperature could be increased not just by decreasing the luminance of the red sub-pixel when white is represented described above but also by another technique as well. For example, the color temperature can also be increased by changing LEDs for the backlight. The display device 100 of this preferred embodiment uses a backlight 220 that emits light with the spectrum BL1 shown in FIG. 6. However, if this backlight is replaced with a backlight that emits light with the spectrum BL2 shown in FIG. 6, which achieves a high intensity at a wavelength associated with blue, then the color temperature can be increased. The results obtained when the color temperature was increased by changing backlights in this manner are represented by the curve X1 in FIG. 5. Since the emission with the spectrum BL2 has a high intensity at a wavelength associated with blue as shown in FIG. 6, the color temperature of the backlight itself with the spectrum BL2 is higher than that of the backlight 220 itself of the display device 100 of this preferred embodiment. It should be noted that when we say just "color temperature" herein, we mean the color temperature of a display device, unless it is stated that we are referring to the color temperature of a backlight.

Figure 16:
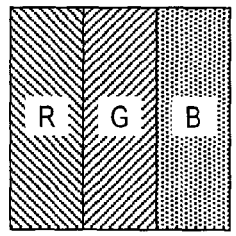
FIG. 16 schematically illustrates a pixel in a conventional LCD.

Another method is setting the luminance of the yellow sub-pixel to be lower than its maximum value when white is represented. Even so, the color temperature can also be increased. Each pixel of this display device 100 includes not only all three sub-pixels of the pixel shown in FIG. 16 but also an additional yellow sub-pixel. That is why if the luminances of all of the four sub-pixels are set equal to their maximum values, yellowish white will be represented. For that reason, by setting the luminance of the yellow sub-pixel to be lower than its maximum value when white is represented, the color temperature can be increased. The results are shown by the curve X2 in FIG. 5.

Still another method for increasing the color temperature is changing the optical conditions of a display mode. Specifically, if the cell thickness and the retardation are decreased to increase the transmittance of the blue sub-pixel, the intensity of light increases at a wavelength associated with blue and the color temperature rises. The results are shown by the curve X3 in FIG. 5.

As described above, if the color temperature just needs to be increased, there are several methods other than setting the luminance of the red sub-pixel to be lower than its maximum value when white is represented. As can be seen if the curve E is compared to the other curves X1, X2 and X3 shown in FIG. 5, however, by setting the luminance of the red sub-pixel to be lower than its maximum value when white is represented, the color temperature can be increased with the decrease in luminance minimized, which cannot be done by any other technique represented by the curve X1, X2 or X3 in FIG. 5.

The luminance drops steeply if the backlights are changed. This is because the spectrum BL2 shown in FIG. 6 has a lower intensity at a wavelength associated with yellow, to which human eyes have high luminosity, than the spectrum BL1 shown in FIG. 6.

The reason why the luminance drops sharply if the luminance of the yellow sub-pixel is set lower than its maximum value when white is represented would be considered as follows. Compared to the situation where the luminances of all sub-pixels are set equal to their maximum values, the luminance of the red sub-pixel is decreased according to the curve E shown in FIG. 5, while that of the yellow sub-pixel is decreased according to the curve X2 shown in FIG. 5. In this case, when the luminances of all sub-pixels are set equal to their maximum values, the yellow sub-pixel will contribute more greatly to setting the luminance of the overall pixel than the red sub-pixel will do. For this reason, the decrease in the luminance of the overall pixel that would be caused by the decrease in the gray scale level of the yellow sub-pixel is greater than that of the overall pixel that would be caused by the decrease in the gray scale level of the red sub-pixel.

Also, when the optical conditions of a display mode are changed, the luminance drops steeply for the following reason. Specifically, if the cell thickness and retardation are decreased to increase the transmittance of the blue sub-pixel, then the transmittance will decrease at the wavelengths other than that associated with blue. As a result, the transmittance of the overall pixel drops.

As described above, by setting the luminance of the red sub-pixel to be lower than its maximum value when white is represented, the color temperature can be increased without significantly decreasing the luminance of the overall pixel when white is represented.

Figure 7:
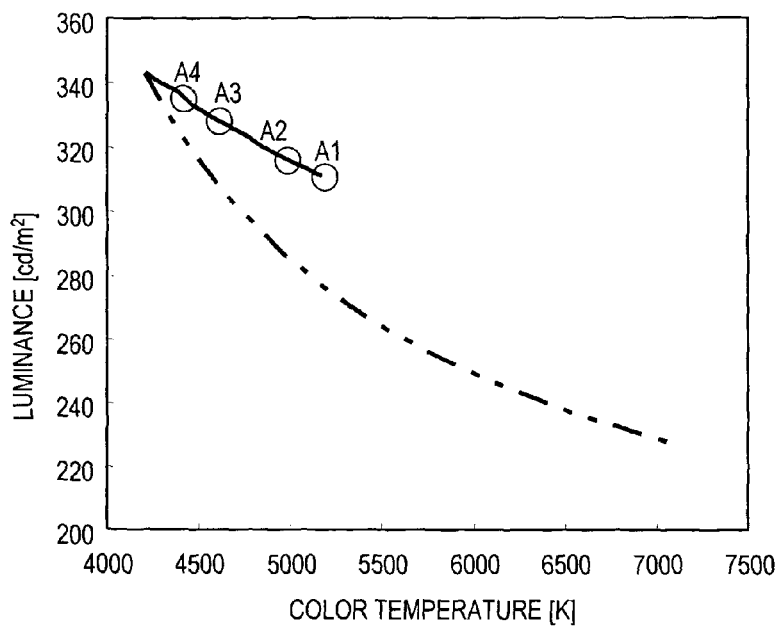
FIG. 7 is a graph showing how the luminance changes with the color temperature in the first preferred embodiment of the present invention.

FIG. 7 is a graph showing how the luminance changes with the color temperature in the display device 100 of this preferred embodiment. In FIG. 7, A1 is associated with Table 3 described above, showing a result in a situation where the red sub-pixel has the minimum luminance when the display device 100 of this preferred embodiment represents white. On the other hand, A2, A3 and A4 are associated with Tables 4, 5 and 6, respectively, showing results in three situations where the luminances of the red sub-pixel are 25%, 50% and 75% of its maximum value when white is represented.

The higher the color temperature, the lower the luminance. This is because as the luminance of the red sub-pixel is decreased to increase the color temperature, the luminance of the overall pixel decreases, too. The two-dot chain line shown in FIG. 7 corresponds to the curve X1 shown in FIG. 5 and shows how the luminance changes with the color temperature when the backlights are changed.

In the display device 100 of this preferred embodiment, the image processor 300 (see FIG. 1) may generate a signal to be supplied to the multi-color display panel 200 based on a TV signal. As the TV signal is an RGB video signal, the image processor 300 converts the RGB video signal into a multi-color display signal to adapt the TV signal to the multi-color display panel 200.

Figure 8:
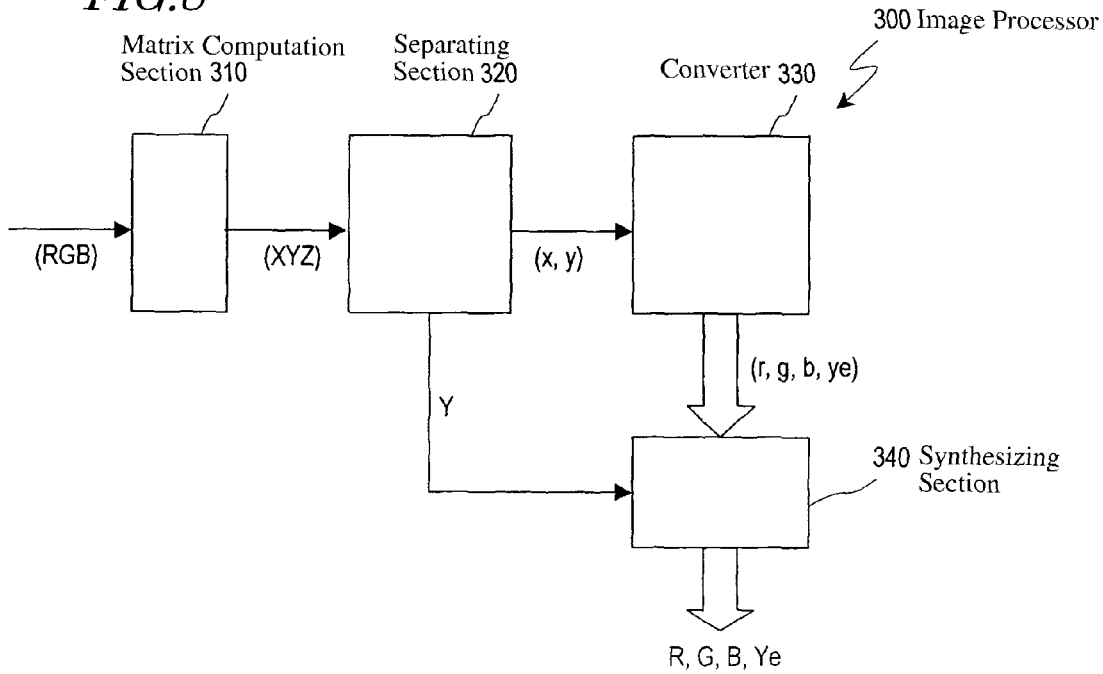
FIG. 8 is a block diagram schematically showing a configuration for an image processor in the first preferred embodiment of the present invention.

FIG. 8 is a block diagram schematically showing a configuration for the image processor 300 in the display device 100 of this preferred embodiment.

The image processor 300 includes a matrix computation section 310 for generating an XYZ signal based on the RGB signal, a separating section 320 for separating the XYZ signal into an (x, y) signal and a Y value signal representing a Y value corresponding to lightness, a converter 330 for generating an (r, g, b, ye) signal based on the (x, y) signal, and a synthesizing section 340 for generating an (R, G, B, Ye) signal based on the (r, g, b, ye) signal and the Y value signal.

In the RGB signal, R, G and B represent the gray scale levels of red, green and blue, respectively, when a display operation is conducted in the three primary colors. The matrix computation section 310 generates an XYZ signal based on the RGB signal. Specifically, the matrix computation section 310 calculates the luminances of the red, green and blue sub-pixels based on the gray scale levels of red, green and blue and then convert the luminances of the red, green and blue sub-pixels by a predetermined equation, thereby generating an XYZ signal including XYZ values.

The separating section 320 calculates x and y values by converting the X, Y and Z values included in the XYZ signal by a predetermined equation, thereby outputting an (x, y) signal, representing the x and y values, to the converter 330. Also, the separating section 320 generates a Y value signal, representing the Y value of XYZ, and outputs it to the synthesizing section 340. The Y value represents lightness. The hue and chroma of a color are defined by the x and y values.

The converter 330 generates an (r, g, b, ye) signal based on the (x, y) signal by reference to lookup tables. The r, g, b and ye values included in the (r, g, b, ye) signal represent the percentages of the luminances of red, green, blue and yellow sub-pixels, respectively. In the converter 330, lookup tables have been prepared for r, g, b and ye values, respectively, and the r, g, b, ye values are determined based on the x and y values. It should be noted that the hues and chromas of the colors are defined by the (r, g, be, ye) values. However, the chromas defined by the (r, g, b, ye) values could be represented as being higher than those defined by the x and y values. The display device 100 of this preferred embodiment can also represent colors, of which the chromas could not be represented by any conventional display device. The lookup tables may be drawn up by using a RAM such as a synchronous dynamic RAM (SDRAM) and a read-only memory (ROM), for example.

The converter 330 outputs an (r, g, b, ye) signal, representing the r, g, b, and ye values, to the synthesizing section 340. Based on the (r, g, b, ye) signal and the Y value signal, the synthesizing section 340 generates an (R, G, B, Ye) signal, in which the R, G, B and Ye values represent the luminances (gray scale levels) of the respective sub-pixels. And the synthesizing section 340 outputs this (R, G, B, Ye) signal to the multi-color display panel 200.

The multi-color display panel 200 controls the luminances (or gray scale levels) of the respective sub-pixels such that the luminances (or gray scale levels) of the respective sub-pixels are respectively equal to the R, G, B and Ye values included in the (R, G, B, Ye) signal. As can be seen, the display device 100 of this preferred embodiment can conduct a display operation in a broader color representation range even if the input signal is an RGB signal representing the three primary colors. The processing method adopted by the image processor 300 of this preferred embodiment is just an example. And the (R, G, B, Ye) signal may be generated by any other method.

In the foregoing example, a situation where white is represented has been described. Actually, however, the display device 100 is required to represent a variety of colors. For example, by setting the luminance of the red sub-pixel close to its maximum value and those of the other sub-pixels (i.e., the green, blue and yellow sub-pixels) equal to certain luminances, red-based colors such as pink and orange can be represented.

Next, it will be described with reference to FIGS. 9 and 10 how the red sub-pixel changes its gray scale levels in a situation where the colors represented by a pixel change from black into white by way of the optimal color with a red hue.

Figure 9:
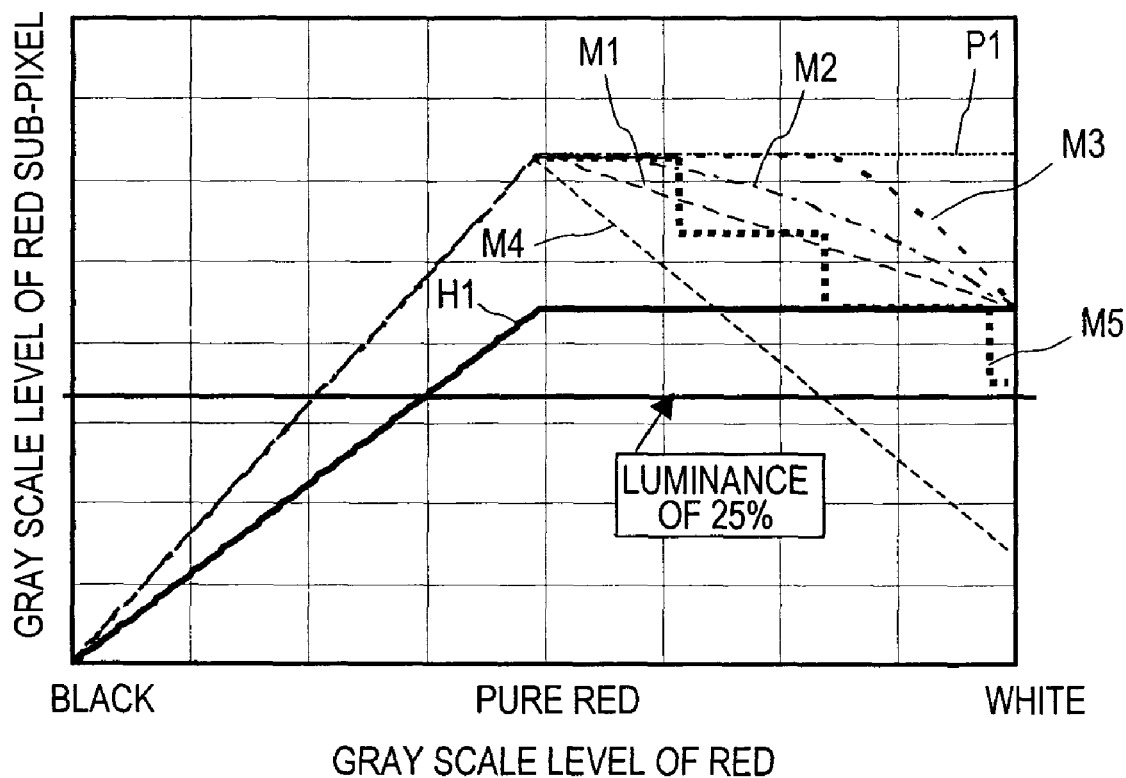
FIG. 9 is a graph showing how the red sub-pixel changes its gray scale levels with respect to the gray scale level of red in the first preferred embodiment of the present invention.

FIG. 9 is a graph showing how the red sub-pixel changes its gray scale levels from black into white by way of red. The abscissa represents the gray scale level of the color represented by the signal that has been supplied to the image processor 300, while the ordinate represents the gray scale level of the red sub-pixel represented by the signal supplied from the image processor 300 to the multi-color display panel 200.

It should be noted that the higher the gray scale level of red, the higher the lightness of the color represented by the pixel. Red has the lowest gray scale level when the pixel represents the color black, and has the highest gray scale level when the pixel represents white. Meanwhile, the higher the gray scale level of the red sub-pixel, the higher the chroma of red.

FIGS. 10A through 10F schematically show the luminances of the red, green, blue and yellow sub-pixels. In FIGS. 10A through 10F, R, G, B and Ye represent the red, green, blue and yellow sub-pixels, respectively. It should be noted that the lengths of the bars shown in FIGS. 10A-10F represent the luminances but do not represent the absolute values of the luminances of the red, green, blue and yellow sub-pixels but the percentages to their respective maximum luminances.

First, it will be described just for reference how the gray scale level changes in a conventional display device. The curve P1 shown in FIG. 9 shows how the gray scale level of the red sub-pixel changes with respect to that of red in a conventional display device.

When the color represented by a pixel is black, red has its lowest gray scale level and the red sub-pixel has its lowest gray scale level, too. However, as the gray scale level of red rises from its lowest value, that of the red sub-pixel also increases.

Figure 10A:
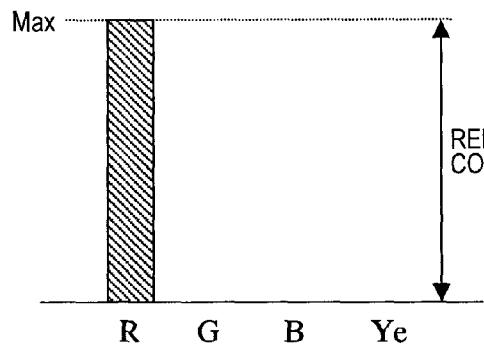
FIGS. 10A through 10F schematically show the luminances of the red (R), green (G), blue (B) and yellow (Ye) sub-pixels.

As shown in FIG. 10A, when the red sub-pixel has the maximum luminance (i.e., its highest gray scale level) and the green, blue and yellow sub-pixels have the minimum luminance, the color represented by a pixel has the highest chroma with a red hue in the L*a*b color system. In that case the color represented by the pixel is called the "optimal color with a red hue".

Next, with the luminance (or gray scale level) of the red sub-pixel kept equal to its maximum luminance (or highest gray scale level), the luminances (or gray scale levels) of the sub-pixels other than the red sub-pixel are increased from their minimum luminance (or lowest gray scale level). As the luminances (or gray scale levels) of the other non-red sub-pixels are increased, the chroma of red decreases but the gray scale level of red (i.e., the lightness of the color represented by the pixel) increases.

Figure 10D:
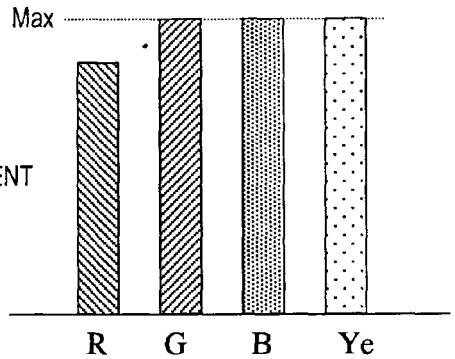
Figure 10B:
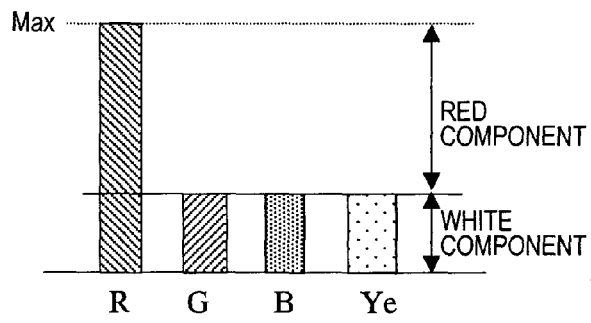

In that case, if the luminances of the green, blue and yellow sub-pixels are increased with the luminance of the red sub-pixel kept maximum, then the color represented by the pixel will have higher lightness than the optimal color as shown in FIG. 10B. It should be noted that the green, blue and yellow sub-pixels have the same output level (or luminance level) in this case.

Figure 10E:
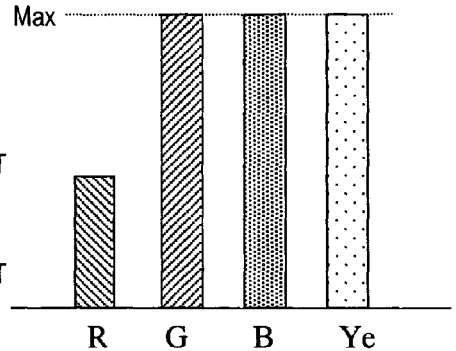
Figure 10C:
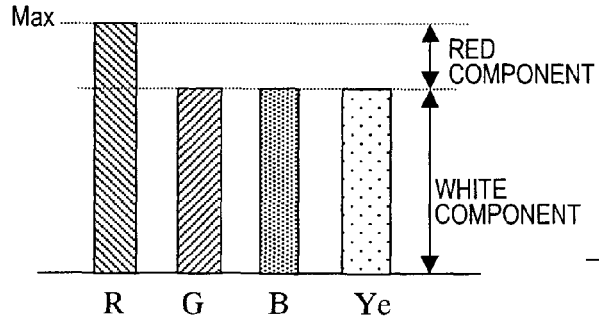

Also, if the luminances of the green, blue and yellow sub-pixels are further increased with the luminance of the red sub-pixel kept maximum, then the color represented by the pixel will be red with even higher lightness as shown in FIG. 10C. The green, blue and yellow sub-pixels have the same output level (or luminance level) in that case, too.

In these cases, a portion of the luminance of the red sub-pixel that has the same output level as the green, blue and yellow sub-pixels may be regarded as "white component" and the other portion of the luminance of the red sub-pixel as "red component" as shown in FIGS. 10B and 10C. Specifically, in FIG. 10B, the red component is more than the white component and the color represented has a relatively high chroma. On the other hand, in FIG. 10C, the red component is less than the white component and the color represented has a relatively low chroma.

Figure 24:
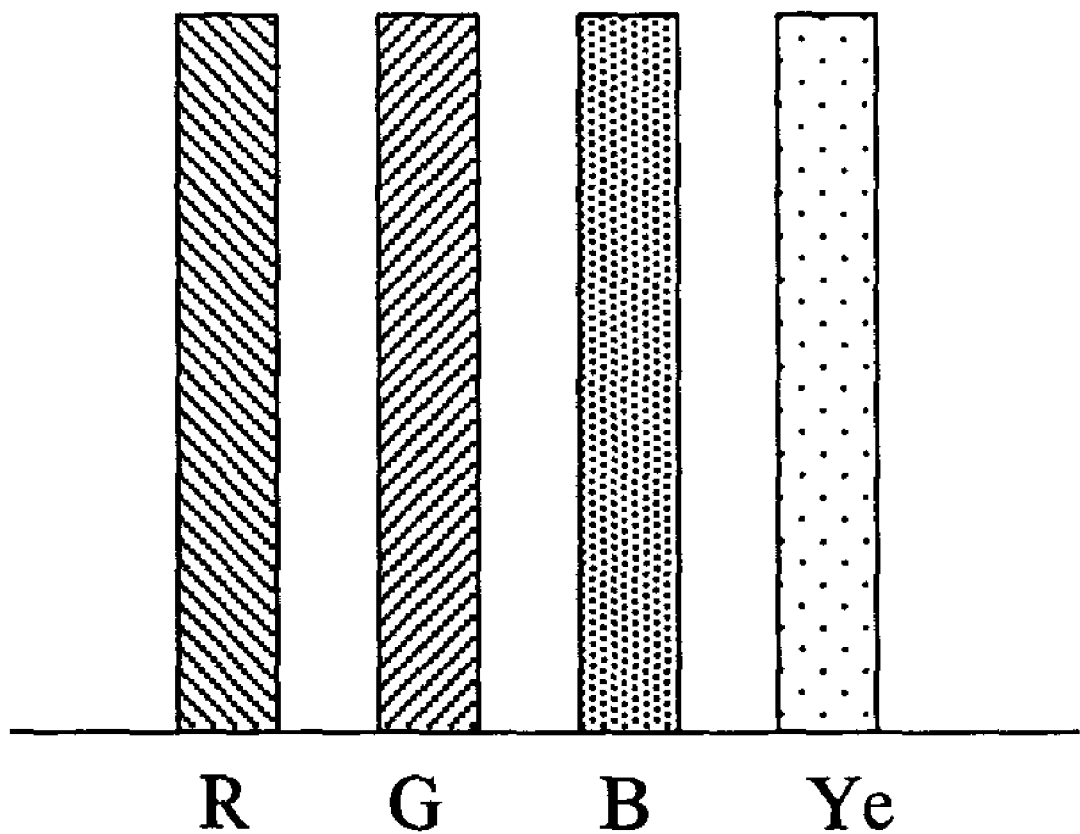
FIG. 24 schematically shows the luminances of red, green, blue and yellow sub-pixels when a conventional LCD represents white.

When the luminances (or gray scale levels) of all sub-pixels, namely, the red, green, blue and yellow sub-pixels, reach their maximum, the pixel represents white as already described with reference to FIG. 24. In that case, however, the white is yellowish white.

Hereinafter, it will be described how gray scale levels change in the display device 100 of this preferred embodiment. In FIG. 9, the curves M1 through M5 represent variations in the gray scale level of the red sub-pixel with respect to the gray scale level of red in the display device 100. In the display device 100 of this preferred embodiment, the luminances of the respective sub-pixels change similarly in the conventional display device until the gray scale level of red reaches a value associated with the optimal color.

According to any of these curves M1 through M5 shown in FIG. 9, when white is represented, the gray scale level of the red sub-pixel is lower than its highest gray scale level. In that case, the luminance of the red sub-pixel is lower than its maximum value, while the green, blue and yellow sub-pixels have their maximum luminances as shown in FIG. 10D.

However, the curves M1 through M5 shown in FIG. 9 are different from each other in how much and/or how the gray scale level of the red sub-pixel varies. In the following description, the gray scale level of the red sub-pixel when white is represented will be sometimes referred to herein as a "predetermined gray scale level". Also, the luminance of the red sub-pixel when the red sub-pixel has the predetermined gray scale level will be sometimes referred to herein as a "predetermined luminance".

According to the curves M1, M2 and M3 shown in FIG. 9, when white is represented, the luminance of the red sub-pixel is set to be approximately 50% of its maximum value. According to the curve M4 shown in FIG. 9, the luminance of the red sub-pixel is set to be approximately 25% of its maximum value. And according to the curve M5 shown in FIG. 9, the luminance of the red sub-pixel is set to be approximately 10% of its maximum value.

Specifically, according to the curve M1 shown in FIG. 9, as the gray scale level of red rises, the gray scale levels of the red sub-pixel are changed linearly from its highest value to the predetermined value. In this case, since the gray scale level of the red sub-pixel may be changed linearly with the variation in the gray scale level of red, the converter 330 of the image processor 300 (see FIG. 8) can be designed easily. For example, the magnitude of the decrease in the output level of the red sub-pixel may be determined as a quantity correlated to the white component by a simple function.

On the other hand, according to the curve M2 shown in FIG. 9, the gray scale levels of the red sub-pixel are changed from its highest value to the predetermined value such that the higher the gray scale level of red, the more significantly the gray scale level of the red sub-pixel decreases. Furthermore, according to the curve M3 shown in FIG. 9, the gray scale level of the red sub-pixel is kept equal to its highest value until the gray scale level of red reaches a certain value. Once the gray scale level of red exceeds that value, the gray scale levels of the red sub-pixel are changed from its highest value to the predetermined value. By changing the output levels non-linearly as in the curves M2 and M3 shown in FIG. 9, colors falling within a range with even higher lightness and even higher chroma can be reproduced.

In any of the curves M1 through M3 shown in FIG. 9, the red sub-pixel preferably changes its gray scale levels such that the color representation range in the red hue surrounds Pointer gamut, which is color range of the object colors of objects that are existent in the world of nature and which shows the maximum ranges of the chromas and lightness of the object colors of those objects existing in the world of nature.

Meanwhile, according to the curve M4 shown in FIG. 9, the luminance of the red sub-pixel when white is represented is set to be approximately 10% of its maximum value. And as the gray scale level of red rises, the gray scale levels of the red sub-pixel are changed linearly from its highest value to the predetermined value. On the other hand, according to the curve M5 shown in FIG. 9, as the gray scale level of red rises, the gray scale levels of the red sub-pixel are changed stepwise from its highest value to the predetermined value.

Figure 10F:
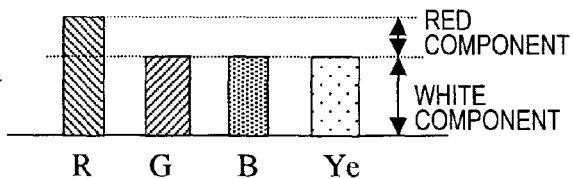

If the luminance of the red sub-pixel when white is represented is less than 25% of its maximum value as in the curve M4 shown in FIG. 9, the luminance of the red sub-pixel when white is represented is much lower than those of the green, blue and yellow sub-pixels as shown in FIG. 10E. In that case, if the luminances of the green, blue and yellow sub-pixels are set to be even lower than the predetermined luminance of the red sub-pixel as shown in FIG. 10F when a red-based color such pink or orange is represented, a red component can be produced. As a result, a bright red can be represented. However, the luminance of the color represented by a pixel is the sum of the luminances of the respective sub-pixels thereof. That is why if the predetermined luminance were low, then the luminance of the overall pixel would be low, too. Also, in that case, the red component cannot form a majority as shown in FIG. 10B. For that reason, if the predetermined luminance were low, a red with high lightness and high chroma (i.e., a light red) could not be represented.

For that reason, as represented by the curves M1 through M3 in FIG. 9, the predetermined luminance is preferably equal to or greater than 25%, but less than 100%, of the maximum luminance (e.g., 96% or less of the maximum luminance). A luminance accounting for 96% of the maximum luminance corresponds to the $63^{rd}$ gray scale level if there are 64 gray scales and corresponds to the $251^{st}$ gray scale level if there are 256 gray scales.

Also, in a situation where the gray scale levels of the red sub-pixel are changed stepwise as represented by the curve M5 in FIG. 9, even if the gray scale level of red has changed by just one level, the gray scale level of the red sub-pixel will change steeply at such a stepped portion, thus producing an abrupt color change. For that reason, as represented by the curves M1 through M3 in FIG. 9, the gray scale levels (or luminances) of the red sub-pixel preferably change continuously from the highest gray scale level (or maximum luminance) to the predetermined gray scale level (or predetermined luminance).

The curve H1 shown in FIG. 9 shows how the red sub-pixel changes its gray scale levels if the gray scale levels of the color represented by a pixel in a display device of a comparative example are changed from its lowest value to the highest one. As can be seen easily by comparing the curve H1 to the curves M1 through M5 shown in FIG. 9, the gray scale level of the red sub-pixel is set lower than the highest gray scale level at the optimal color in the red hue according to the curve H1 shown in FIG. 9. For this reason, the color cannot be represented in a broad color representation range.

Figure 11:
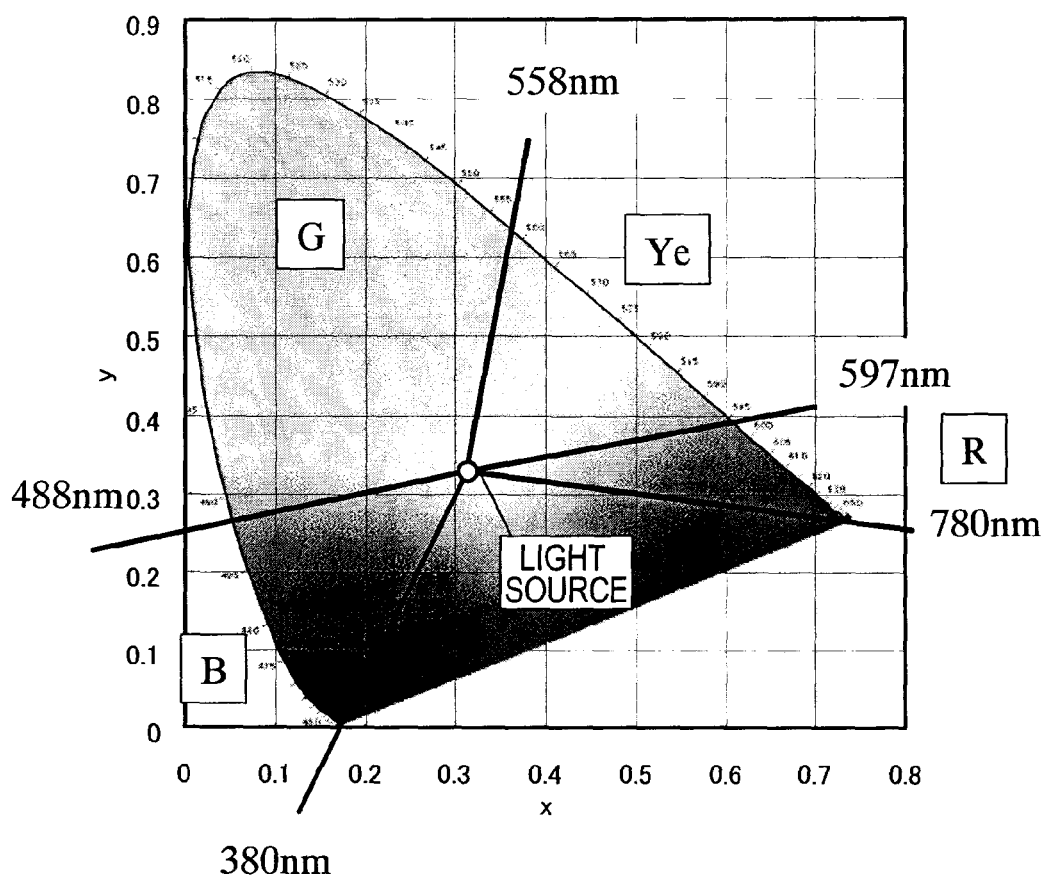
FIG. 11 is a graph showing a chromaticity diagram of the XYZ color system.

FIG. 11 is a graph showing a chromaticity diagram of the XYZ color system. A spectrum locus and dominant wavelengths are shown in FIG. 11. In this description, in the chromaticity diagram of the XYZ color system, a sub-pixel with a dominant wavelength of 597 nm to less than 780 nm will be referred to herein as a "red sub-pixel", a sub-pixel with a dominant wavelength of 488 nm to less than 558 nm will be referred to herein as a "green sub-pixel", a sub-pixel with a dominant wavelength of 380 nm to less than 488 nm will be referred to herein as a "blue sub-pixel", and a sub-pixel with a dominant wavelength of 558 nm to less than 597 nm will be referred to herein as a "yellow sub-pixel". Such relationships between the dominant wavelengths and the hue is described by Kelly, K. L. in Color Designations of Lights, J. Opt. Soc. Am. 33 (1943), p. 627, for example.

The display device 100 of this preferred embodiment sets the luminance of the red sub-pixel lower than its maximum value in representing white without changing the configuration of a conventional liquid crystal display device significantly, thereby increasing the color temperature with the decrease in luminance minimized.

In the foregoing description, the color filters 218 are preferably arranged on the counter substrate 214. However, the color filters 218 may be arranged on the active-matrix substrate 212 instead.

Also, in the above description, the sub-pixels are arranged in a mosaic pattern. However, the present invention is not limited to it. Alternatively, the red, green, blue and yellow sub-pixels may also have a strip shape and may be arranged in a striped pattern.

Furthermore, in the above description, only the red sub-pixel has its luminance set lower than its maximum value when white is represented. However, the present invention is not limited to it. Optionally, not just the red sub-pixel but also other sub-pixels may have their luminances set lower than their maximum values. For example, when white is represented, not just the red sub-pixel but also the yellow and green sub-pixels may have their luminances set lower than their maximum values. By setting the respective luminances of three sub-pixels lower than their maximum values in this manner when white is represented, an appropriate color balance can be struck and a natural color representation is realized over the entire screen.

Second Preferred Embodiment

The display device of the first preferred embodiment described above uses the similar backlight 220 as that of a conventional LCD. However, the present invention is in no way limited to that specific preferred embodiment.

Hereinafter, a second preferred embodiment of a display device according to the present invention will be described with reference to the accompanying drawings. The display device 100 of this preferred embodiment has the similar configuration as the counterpart of the first preferred embodiment that has already been described with reference to FIGS. 1, 2 and 8 except that the backlight 220 emits radiation with a different spectrum. Thus, the repeated description thereof is omitted to avoid redundancies.

Figure 12:
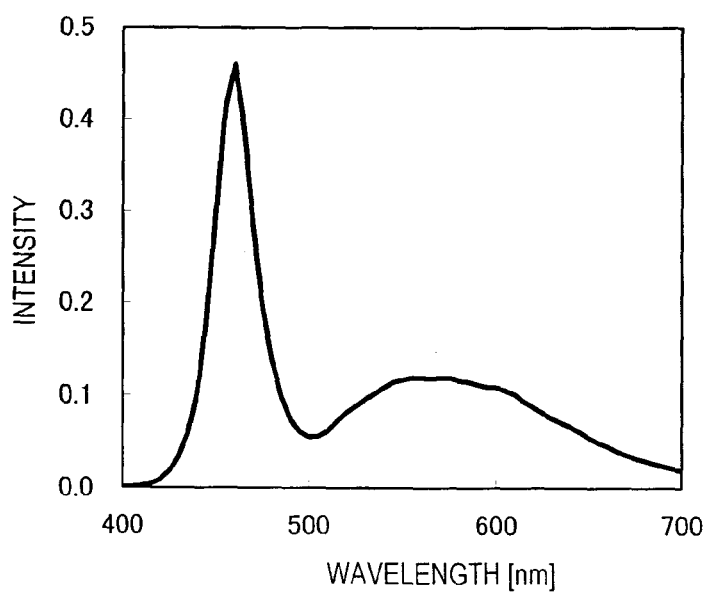
FIG. 12 is a graph showing the spectrum of the radiation that was emitted from the backlight of a second preferred embodiment of a display device according to the present invention.

FIG. 12 is a graph showing the spectrum of the radiation that was emitted from the backlight 220 of the display device 100 of this preferred embodiment. The backlight 220 for the display device 100 of this preferred embodiment emits light, of which the intensity at a wavelength associated with blue is higher, and the intensities at wavelengths associated with the colors green and red are lower, than those of the light emitted from the backlight for the display device of the first preferred embodiment. And the chromaticities (xy) thereof are (0.28, 0.25). The color temperature of this backlight 220 is higher than that of the backlight for the display device of the first preferred embodiment. It should be noted that the display device 100 includes a liquid crystal layer with the similar wavelength-transmitted light intensity characteristic as the display device of the first preferred embodiment. The color filters 218 also have the similar wavelength characteristic as the display device of the first preferred embodiment.

The following Table 7 shows exemplary XYZ color system values of colors represented by pixels in the display device 100 of this preferred embodiment:

TABLE 7

|   | Red | Green | Blue | Yellow | White |
|---|---|---|---|---|---|
| X | 54.2 | 43.6 | 34.7 | 151.9 | 230.2 |
| Y | 27.6 | 90.1 | 11.4 | 166.2 | 267.7 |
| Z | 3.0 | 13.6 | 199.6 | 13.1 | 226.4 |
| x | 0.639 | 0.296 | 0.141 | 0.459 | 0.318 |
| y | 0.325 | 0.611 | 0.046 | 0.502 | 0.370 |
| z | 0.036 | 0.093 | 0.813 | 0.040 | 0.313 |

Color temperature = 6100 K

The backlight 220 for the display device 100 of this preferred embodiment is different from the counterpart for the display device of the first preferred embodiment described above. That is why the X, Y and Z values shown in Table 7 are different from those shown in Tables 3 to 6. However, the color filters 218 and the liquid crystal layer 216 are the similar color filters and liquid crystal layer of the display device of the first preferred embodiment. Thus, as can be seen easily by comparing Table 7 to Tables 3 to 6, the x, y and z values of the display device 100 of this preferred embodiment are almost equal to those of the display device of the first preferred embodiment. The display device 100 of this preferred embodiment operates similarly to the counterpart of the first preferred embodiment described above.

In this case, when white is represented, the red sub-pixel has the minimum luminance. That is why in the display device 100 of this preferred embodiment, the X of the white is the sum of the X of Blue, Green and Yellow, without that of Red. In the same way, the Y of the white is the sum of the Y of Blue, Green and Yellow, without that of Red. And the Z of the white is the sum of the Z of Blue, Green and Yellow, without that of Red. Consequently, the X, Y and Z of the white in the display device 100 of this embodiment are 230.2 (=43.6+34.7+151.9), 267.7 (=90.1+11.4+166.2), and 226.4 (=13.6+199.6+13.1), respectively.

In this case, the color temperature of the display device 100 is 6100 K as shown in Table 7. Thus, the display device 100 of this preferred embodiment achieves an even higher color temperature than 5200 K, which is achieved by the display device of the first preferred embodiment that has already been described with reference to Table 3. This is because the backlight 220 of the display device 100 emits light, of which the intensity at a wavelength associated with blue is higher, and the intensities at wavelengths associated with the colors green and red are lower, than those of the light emitted from the backlight for the display device of the first preferred embodiment.

It should be noted that when white is represented, the luminance of the red sub-pixel does not have to be its minimum one. Hereinafter, three different situations where the luminances of the red sub-pixel are respectively 25%, 50% and 75% of its maximum one when white is represented will be described with reference to Tables 8, 9 and 10.

The following Table 8 shows exemplary XYZ color system values of colors represented by pixels in the display device 100 of this preferred embodiment. In this case, when white is represented, the luminance of the red sub-pixel is set to be 25% of its maximum luminance:

TABLE 8

|   | Red | Green | Blue | Yellow | White |
| --- | --- | --- | --- | --- | --- |
| X | 54.2 | 43.6 | 34.7 | 151.9 | 243.7 |
| Y | 27.6 | 90.1 | 11.4 | 166.2 | 274.6 |
| Z | 3.0 | 13.6 | 199.6 | 13.1 | 227.1 |
| x | 0.639 | 0.296 | 0.141 | 0.459 | 0.327 |
| y | 0.325 | 0.611 | 0.046 | 0.502 | 0.368 |
| z | 0.036 | 0.093 | 0.813 | 0.040 | 0.305 |

Color temperature = 5700 K

Since the luminance of the red sub-pixel when white is represented is 25% of its maximum value, the X, Y and Z of the white in the display device 100 of this preferred embodiment are the sum of 25% of the X of Red and the respective X of Green, Blue and Yellow, the sum of 25% of the Y of Red and the respective Y of Green, Blue and Yellow, and the sum of 25% of the Z of Red and the respective Z of Green, Blue and Yellow, respectively. In this case, the color temperature is 5700 K as shown in Table 8.

The following Table 9 shows exemplary XYZ color system values of colors represented by pixels in the display device 100 of this preferred embodiment. In this case, when white is represented, the luminance of the red sub-pixel is set to be 50% of its maximum luminance:

TABLE 9

|   | Red | Green | Blue | Yellow | White |
| --- | --- | --- | --- | --- | --- |
| X | 54.2 | 43.6 | 34.7 | 151.9 | 257.3 |
| Y | 27.6 | 90.1 | 11.4 | 166.2 | 281.5 |
| Z | 3.0 | 13.6 | 199.6 | 13.1 | 227.9 |
| x | 0.639 | 0.296 | 0.141 | 0.459 | 0.336 |
| y | 0.325 | 0.611 | 0.046 | 0.502 | 0.367 |
| z | 0.036 | 0.093 | 0.813 | 0.040 | 0.297 |

Color temperature = 5400 K

Since the luminance of the red sub-pixel when white is represented is 50% of its maximum value, the X, Y and Z of the white in the display device 100 of this preferred embodiment are the sum of 50% of the X of Red and the respective X of Green, Blue and Yellow, the sum of 50% of the Y of Red and the respective Y of Green, Blue and Yellow, and the sum of 50% of the Z of Red and the respective Z of Green, Blue and Yellow, respectively. In this case, the color temperature is 5400 K as shown in Table 9.

The following Table 10 shows exemplary XYZ color system values of colors represented by pixels in the display device 100 of this preferred embodiment. In this case, when white is represented, the luminance of the red sub-pixel is set to be 75% of its maximum luminance:

TABLE 10

|   | Red | Green | Blue | Yellow | White |
| --- | --- | --- | --- | --- | --- |
| X | 54.2 | 43.6 | 34.7 | 151.9 | 270.8 |
| Y | 27.6 | 90.1 | 11.4 | 166.2 | 288.4 |
| Z | 3.0 | 13.6 | 199.6 | 13.1 | 228.6 |
| x | 0.639 | 0.296 | 0.141 | 0.459 | 0.344 |
| y | 0.325 | 0.611 | 0.046 | 0.502 | 0.366 |
| z | 0.036 | 0.093 | 0.813 | 0.040 | 0.290 |

Color temperature = 5000 K

Since the luminance of the red sub-pixel when white is represented is 75% of its maximum value, the X, Y and Z of the white in the display device 100 of this preferred embodiment are the sum of 75% of the X of Red and the respective X of Green, Blue and Yellow, the sum of 75% of the Y of Red and the respective Y of Green, Blue and Yellow, and the sum of 75% of the Z of Red and the respective Z of Green, Blue and Yellow, respectively. In this case, the color temperature is 5000 K as shown in Table 10.

Figure 13:
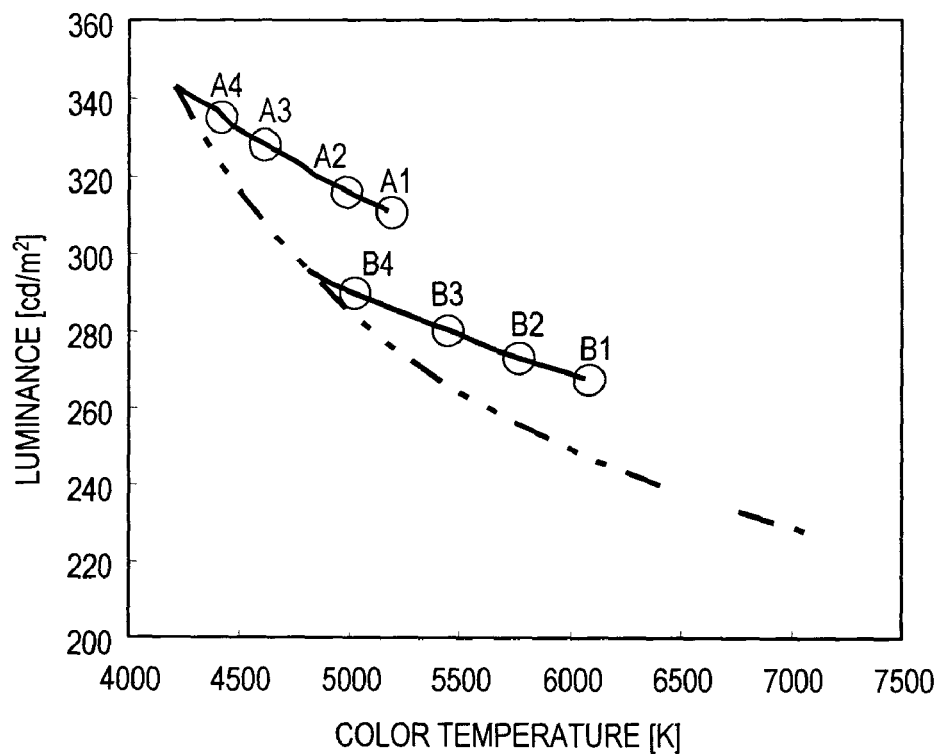
FIG. 13 is a graph showing how the luminance changes with the color temperature in the second preferred embodiment of the present invention.

FIG. 13 is a graph showing how the luminance changes with the color temperature in the display device 100 of this preferred embodiment. In FIG. 13, B1 is associated with Table 7 described above, showing a result in a situation where the red sub-pixel has the minimum luminance when the display device 100 of this preferred embodiment represents white. On the other hand, B2, B3 and B4 are associated with Tables 8, 9 and 10, respectively showing results in three situations where the luminances of the red sub-pixel are 25%, 50% and 75% of its maximum value when white is represented. As can be seen, the lower the luminance of the red sub-pixel when white is represented, the higher the color temperature achieved can be.

In the graph of FIG. 13, the results A1 through A4 of the preferred embodiment of the display device that has already been described with reference to FIG. 7 are also shown just for reference. In addition, not only in the graph shown in FIG. 7 but also in the graph shown in FIG. 13, the two-dot chain line also represents how the luminance varies with the color temperature if the color temperature is raised by changing the backlights. If the color temperature is increased just by changing the backlights, the luminance drops significantly.

On the other hand, in the display device 100 of this preferred embodiment, not just the color temperature of the backlight 220 itself is raised but also the luminance of the red sub-pixel when white is represented is set lower than its maximum value. As a result, an even higher color temperature is achieved with the decrease in luminance minimized.

Third Preferred Embodiment

Hereinafter, a third preferred embodiment of a display device according to the present invention will be described with reference to the accompanying drawings.

The display device 100 of this preferred embodiment has a similar configuration as that of the counterparts of the first and second preferred embodiments that have already been described with reference to FIGS. 1, 2 and 8 except that the backlight 220 emits radiation with a different spectrum. Thus, the repeated description thereof is omitted to avoid redundancies.

Figure 14:
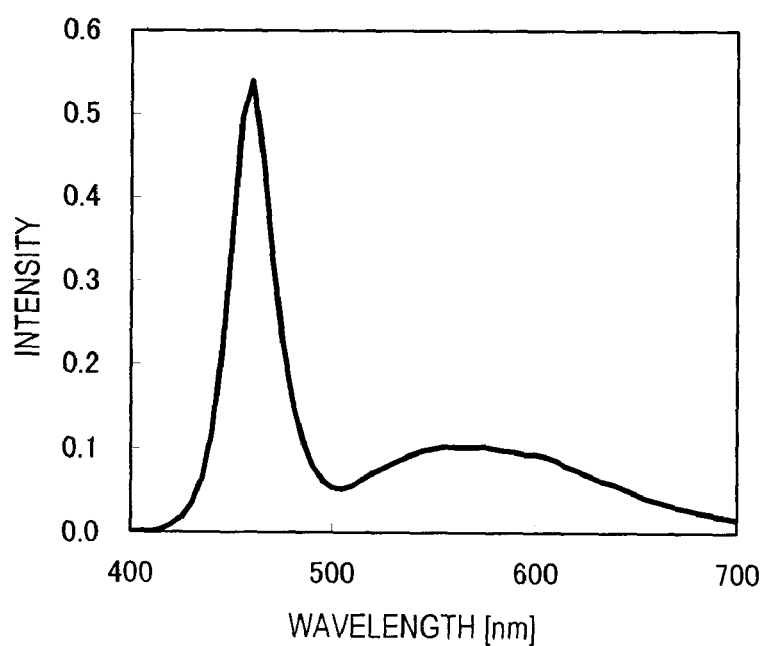
FIG. 14 is a graph showing the spectrum of the radiation that was emitted from the backlight of a third preferred embodiment of a display device according to the present invention.

FIG. 14 is a graph showing the spectrum of the radiation that was emitted from the backlight 220 of the display device 100 of this preferred embodiment. The backlight 220 for the display device 100 of this preferred embodiment emits light, of which the intensity at a wavelength associated with blue is even higher, and the intensities at wavelengths associated with the colors green and red are even lower, than those of the light emitted from the backlight for the display device of the second preferred embodiment. And the chromaticities (xy) thereof are (0.25, 0.22). It should be noted that the display device 100 includes a liquid crystal layer with the similar wavelength-transmitted light intensity characteristic as the display device of the first preferred embodiment. The color filters 218 also have the similar wavelength characteristic as the display device of the first preferred embodiment.

The following Table 11 shows exemplary XYZ color system values of colors represented by pixels in the display device 100 of this preferred embodiment:

TABLE 11

|   | Red | Green | Blue | Yellow | White |
|---|---|---|---|---|---|
| X | 46.4 | 37.6 | 40.7 | 130.1 | 208.4 |
| Y | 23.5 | 78.0 | 12.6 | 142.4 | 233.0 |
| Z | 3.5 | 14.2 | 234.2 | 14.3 | 262.8 |
| x | 0.631 | 0.289 | 0.142 | 0.454 | 0.296 |
| y | 0.320 | 0.601 | 0.044 | 0.496 | 0.331 |
| z | 0.048 | 0.110 | 0.815 | 0.050 | 0.373 |

Color temperature = 7500 K

The backlight 220 for the display device 100 of this preferred embodiment is different from the counterparts for the display devices of the first and second preferred embodiments described above. That is why the X, Y and Z values shown in Table 11 are different from those shown in Tables 3 to 6 or those shown in Tables 7 to 10. However, the color filters 218 and the liquid crystal layer 216 are the similar color filters and liquid crystal layer of the display devices of the first and second preferred embodiments. Thus, as can be seen easily by comparing Table 11 to Tables 3 to 6 or to Tables 7 to 10, the x, y and z values of the display device 100 of this preferred embodiment are almost equal to those of the display devices of the first and second preferred embodiments. The display device 100 of this preferred embodiment operates similarly to the counterparts of the first and second preferred embodiments described above.

In this case, when white is represented, the red sub-pixel has the minimum luminance. That is why in the display device 100 of this preferred embodiment, the X of the white is the sum of the X of Green, Blue and Yellow, without that of Red. In the same way, the Y of the white is the sum of the Y of Green, Blue and Yellow, without that of Red. And the Z of the white is the sum of the Z of Green, Blue and Yellow, without that of Red. Consequently, the X, Y and Z of the white in the display device 100 of this preferred embodiment are 208.4 (=37.6+40.7+130.1), 233.0 (=78.0+12.6+142.4), and 262.8 (=14.2+234.2+14.3), respectively.

In this case, the color temperature of the display device 100 is 7500 K as shown in Table 11. Thus, the display device 100 of this preferred embodiment achieves an even higher color temperature than 6100 K, which is achieved by the display device of the second preferred embodiment that has already been described with reference to Table 7. This is because the backlight 220 for the display device 100 of this preferred embodiment emits light, of which the intensity at a wavelength associated with blue is higher, and the intensities at wavelengths associated with the colors green and red are lower, than those of the light emitted from the backlight for the display device of the second preferred embodiment.

It should be noted that when white is represented, the gray scale level of the red sub-pixel does not have to be its lowest one. Hereinafter, three different situations where the luminances of the red sub-pixel are respectively 25%, 50% and 75% of its maximum one when white is represented will be described with reference to Tables 12, 13 and 14.

The following Table 12 shows exemplary XYZ color system values of colors represented by pixels in the display device 100 of this preferred embodiment. In this case, when white is represented, the luminance of the red sub-pixel is set to be 25% of its maximum luminance:

TABLE 12

|   | Red | Green | Blue | Yellow | White |
|---|---|---|---|---|---|
| X | 46.4 | 37.6 | 40.7 | 130.1 | 220.0 |
| Y | 23.5 | 78.0 | 12.6 | 142.4 | 238.9 |
| Z | 3.5 | 14.2 | 234.2 | 14.3 | 263.7 |
| x | 0.631 | 0.289 | 0.142 | 0.454 | 0.304 |
| y | 0.320 | 0.601 | 0.044 | 0.496 | 0.331 |
| z | 0.048 | 0.110 | 0.815 | 0.050 | 0.365 |

Color temperature = 7000 K

Since the luminance of the red sub-pixel when white is represented is 25% of its maximum value, the X, Y and Z of the white in the display device 100 of this preferred embodiment are the sum of 25% of the X of Red and the respective X of Green, Blue and Yellow, the sum of 25% of the Y of Red and the respective Y of Green, Blue and Yellow, and the sum of 25% of the Z of Red and the respective Z of Green, Blue and Yellow, respectively. In this case, the color temperature is 7000 K as shown in Table 12.

The following Table 13 shows exemplary XYZ color system values of colors represented by pixels in the display device 100 of this preferred embodiment. In this case, when white is represented, the luminance of the red sub-pixel is set to be 50% of its maximum luminance:

TABLE 13

|   | Red | Green | Blue | Yellow | White |
|---|---|---|---|---|---|
| X | 46.4 | 37.6 | 40.7 | 130.1 | 231.6 |
| Y | 23.5 | 78.0 | 12.6 | 142.4 | 244.7 |
| Z | 3.5 | 14.2 | 234.2 | 14.3 | 264.6 |
| x | 0.631 | 0.289 | 0.142 | 0.454 | 0.313 |
| y | 0.320 | 0.601 | 0.044 | 0.496 | 0.330 |
| z | 0.048 | 0.110 | 0.815 | 0.050 | 0.357 |

Color temperature = 6500 K

Since the luminance of the red sub-pixel when white is represented is 50% of its maximum value, the X, Y and Z of the white in the display device 100 of this preferred embodiment are the sum of 50% of the X of Red and the respective X of Green, Blue and Yellow, the sum of 50% of the Y of Red and the respective Y of Green, Blue and Yellow, and the sum of 50% of the Z of Red and the respective Z of Green, Blue and Yellow, respectively. In this case, the color temperature is 6500 K as shown in Table 13.

The following Table 14 shows exemplary XYZ color system values of colors represented by pixels in the display device 100 of this preferred embodiment. In this case, when white is represented, the luminance of the red sub-pixel is set to be 75% of its maximum luminance:

TABLE 14

|   | Red | Green | Blue | Yellow | White |
|---|-----|-------|------|--------|-------|
| X | 46.4 | 37.6 | 40.7 | 130.1 | 243.2 |
| Y | 23.5 | 78.0 | 12.6 | 142.4 | 250.6 |
| Z | 3.5 | 14.2 | 234.2 | 14.3 | 265.5 |
| x | 0.631 | 0.289 | 0.142 | 0.454 | 0.320 |
| y | 0.320 | 0.601 | 0.044 | 0.496 | 0.330 |
| z | 0.048 | 0.110 | 0.815 | 0.050 | 0.350 |

Color temperature = 6100 K

Since the luminance of the red sub-pixel when white is represented is 75% of its maximum value, the X, Y and Z of the white in the display device 100 of this preferred embodiment are the sum of 75% of the X of Red and the respective X of Green, Blue and Yellow, the sum of 75% of the Y of Red and the respective Y of Green, Blue and Yellow, and the sum of 75% of the Z of Red and the respective Z of Green, Blue and Yellow, respectively. In this case, the color temperature is 6100 K as shown in Table 14.

Figure 15:
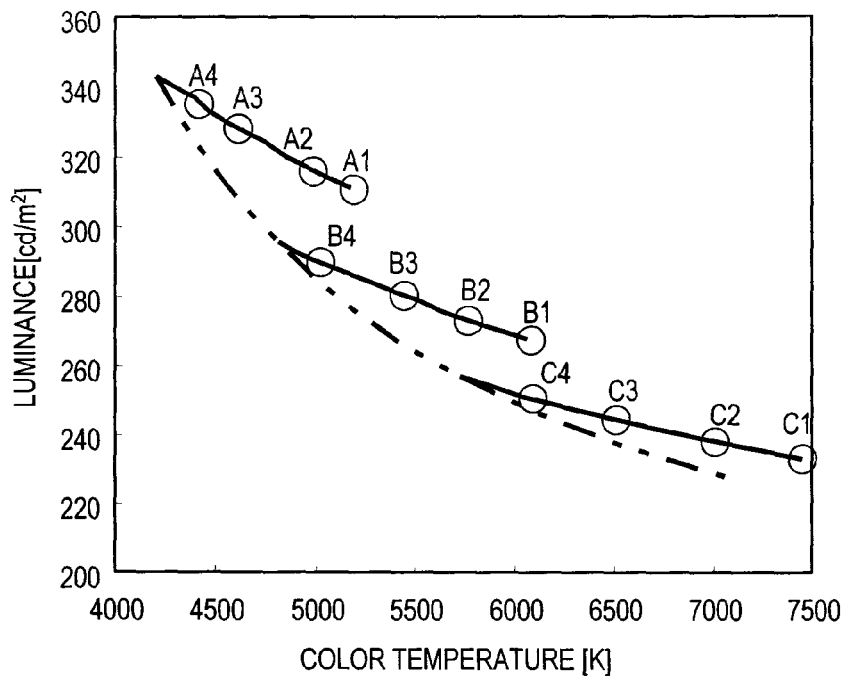
FIG. 15 is a graph showing how the luminance changes with the color temperature in the third preferred embodiment of the present invention.

FIG. 15 is a graph showing how the luminance changes with the color temperature in the display device 100 of this preferred embodiment. In FIG. 15, C1 is associated with Table 11 described above, showing a result in a situation where the red sub-pixel has the minimum luminance when the display device 100 of this preferred embodiment represents white. On the other hand, C2, C3 and C4 are associated with Tables 12, 13 and 14, respectively showing results in three situations where the luminances of the red sub-pixel are 25%, 50% and 75% of its maximum value when white is represented. As can be seen, the lower the luminance of the red sub-pixel when white is represented, the higher the color temperature achieved can be.

In the graph of FIG. 15, the results A1 through A4 of the first preferred embodiment of the display device that has already been described with reference to FIG. 7 and the results B1 through B4 of the second preferred embodiment of the display device that has already been described with reference to FIG. 13 are also shown just for reference. In addition, not only in the graphs shown in FIGS. 7 and 13 but also in the graph shown in FIG. 15, the two-dot chain line also represents how the luminance varies with the color temperature if the color temperature is raised by changing the backlights. If the color temperature is increased just by changing the backlights, the luminance drops significantly. On the other hand, in the display device 100 of this preferred embodiment, not just the color temperature of the backlight 220 itself is raised but also the luminance of the red sub-pixel when white is represented is set lower than its maximum value. As a result, an even higher color temperature is achieved with the decrease in luminance minimized.

It should be noted that the color temperature is preferably at least equal to 5000 K, more preferably 5500 K or more. Then, non-yellowish color white of a natural tone can be represented.

In the display device 100 of the first through third preferred embodiments described above, each single pixel preferably has multiple sub-pixels. However, the present invention is not limited to it. Alternatively, the display device according to the present invention may also be driven by a field sequential technique. According to the field sequential technique, a color display operation is conducted by forming a single frame of multiple subframes associated with the respective primary colors. Specifically, each single frame includes a red subframe to make the pixel represent red, a green subframe to make the pixel represent green, a blue subframe to make the pixel represent blue, and a yellow subframe to make the pixel represent yellow. By setting the luminance of a pixel in the red subframe lower than its value associated with the highest gray scale level as shown in FIG. 4, for example, when the pixel represents white in a frame, a similar effect can be achieved. In that case, the multi-color display panel 200 includes four light sources for the colors red, green, blue and yellow, respectively, which are turned ON sequentially one after another within one field. Those light sources may be either fluorescent tubes or LEDS.

Also, in the display device 100 of the first to third preferred embodiments described above, a liquid crystal panel has been described as an exemplary multi-color display panel. However, the present invention is not limited to it. Alternatively, the multi-color display panel may also be a CRT, a plasma display panel (PDP), an SED display panel, a liquid crystal projector or any other type of display device that can conduct a multi-color display operation.

The elements included in the image processor 300 in the display device 100 of the first through third preferred embodiments described above may be implemented not only by hardware components but also by software either partially or even entirely. If those elements are implemented by software, the software programs may be run by a computer. In that case, the computer should include a CPU (central processing unit) to execute various programs and a RAM (random access memory) functioning as a work area to execute those programs and so on. And the programs to realize the functions of the elements described above are executed by the computer, thereby making the computer operate as those elements.

Those programs may be fed into the computer either via a storage medium or over a telecommunications network. The storage medium may be either removable from the computer or built in the computer. Also, the storage medium may be loaded into the computer such that the computer can read the program code stored there either directly by itself or by way of a program reader that is connected as an external storage to the computer. Examples of preferred storage media include tapes such as magnetic tapes and cassette tapes, magnetic disks such as flexible disks and hard disks, magneto-optical disks such as MOs and MDs, disks including optical disks such as CD-ROMs, DVDs, and CD-Rs or other disks, cards such as IC cards (including memory cards) and optical cards, and semiconductor memories such as mask ROMs, EPROMs (erasable programmable read-only memories), EEPROMs (electrically erasable programmable read-only memories) and flash ROMs. If the programs are supplied via a telecommunications network, those programs may be a carrier wave or data signals by which the program code is transmitted electronically.

A display device according to various preferred embodiments of the present invention can be used effectively as a monitor for a personal computer, a liquid crystal TV, a liquid crystal projector, or a display panel for a cellphone. Among other things, the display device according to preferred embodiments of the present invention can be used particularly effectively as a small-sized display device such as a display panel for a cellphone. Generally speaking, mobile electronic devices including cellphones, digital still cameras, and laptops are often driven by battery, for which some space always needs to be provided for. Furthermore, a display device for such a mobile electronic device usually has small pixels, and therefore, a low aperture ratio. Consequently, the smaller the size of a display device, the lower the luminance efficiency tends to be. However, the display device according to preferred embodiments of the present invention can increase the luminance efficiency significantly by adding yellow (Ye) that would achieve high luminance efficiency to red (R), green (G) and blue (B). In addition, by using yellow (Ye) with high chroma, the luminance efficiency can be increased without narrowing the color reproduction range.

These and other features, elements, characteristics and advantages of the present invention will become more apparent from the following detailed description of preferred embodiments thereof with reference to the drawings.

The invention claimed is:

1. A display device comprising:
a pixel that is defined by a plurality of sub-pixels; wherein
the sub-pixels include a red sub-pixel representing red, a green sub-pixel representing green, a blue sub-pixel representing blue, and a yellow sub-pixel representing yellow, and when the pixel represents white, the luminance of the red sub-pixel is lower than its luminance corresponding to a highest gray scale level; and
when the pixel represents white, a sum of the luminances of the red, the green, the blue, and the yellow sub-pixels is about 90% or more of a sum of the luminances of the red, the green, the blue, and the yellow sub-pixels at corresponding highest gray scale levels thereof.

2. The display device of claim 1, wherein the red sub-pixel has a dominant wavelength of about 597 nm to less than about 780 nm, the green sub-pixel has a dominant wavelength of about 488 nm to less than about 558 nm, the blue sub-pixel has a dominant wavelength of about 380 nm to less than about 488 nm, and the yellow sub-pixel has a dominant wavelength of about 558 nm to less than about 597 nm.

3. The display device of claim 1, wherein when the pixel represents white, the luminance of the red sub-pixel is about 96% or less of its luminance corresponding to the highest gray scale level.

4. The display device of claim 1, wherein when the pixel represents white, the luminance of the red sub-pixel is about 25% or more of its luminance corresponding to the highest gray scale level.

5. The display device of claim 1, wherein when the pixel represents white, the luminances of the green and yellow sub-pixels corresponds to a highest gray scale level thereof.

6. The display device of claim 1, wherein the color temperature of white represented by the pixel is higher than about 4200 K.

7. The display device of claim 6, wherein the color temperature of white represented by the pixel is equal to or higher than about 5000 K.

8. A display device comprising a pixel and conducting a display operation using a frame that includes a red subframe to make the pixel represent red, a green subframe to make the pixel represent green, a blue subframe to make the pixel represent blue, and a yellow subframe to make the pixel represent yellow; wherein
when the pixel represents white in the frame, the luminance of the pixel in the red subframe is lower than its luminance corresponding to a highest gray scale level; and
when the pixel represents white in the frame, a sum of the luminances of the red, the green, the blue, and the yellow subframes is about 90% or more of a sum of the luminances of the red, the green, the blue, and the yellow subframes at corresponding highest gray scale levels thereof.

* * * * *